LEATHER

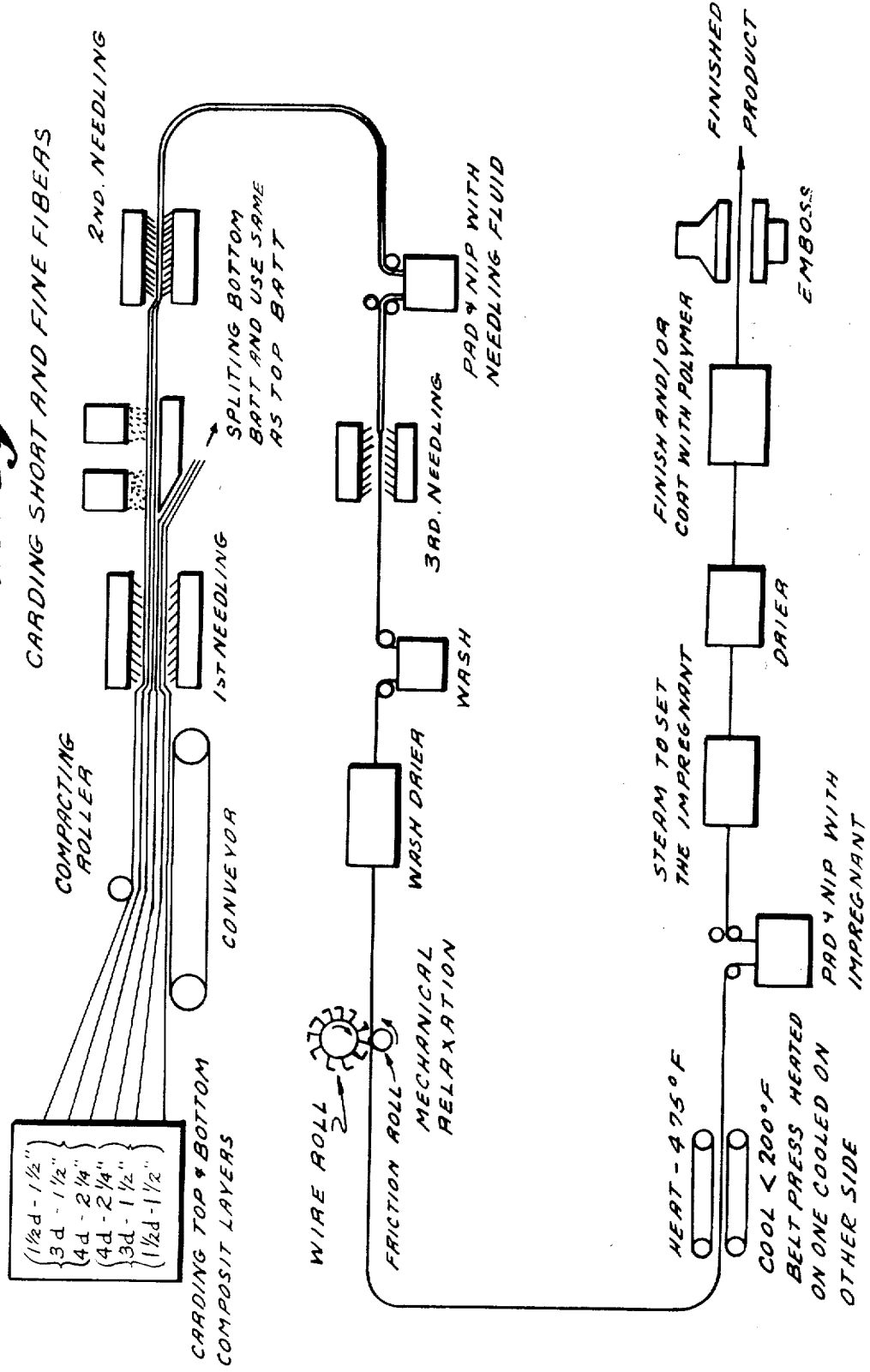

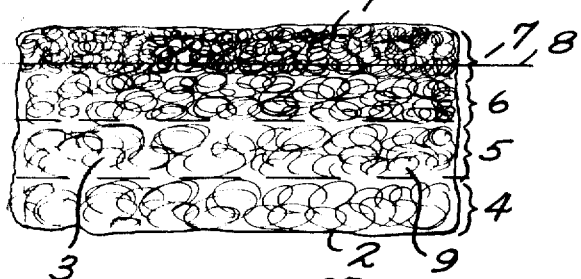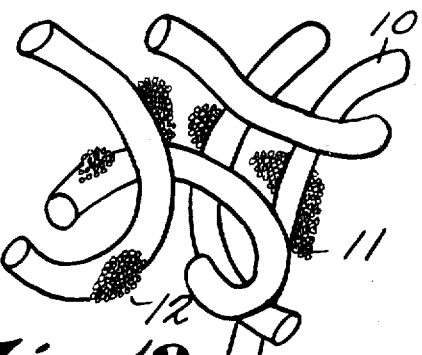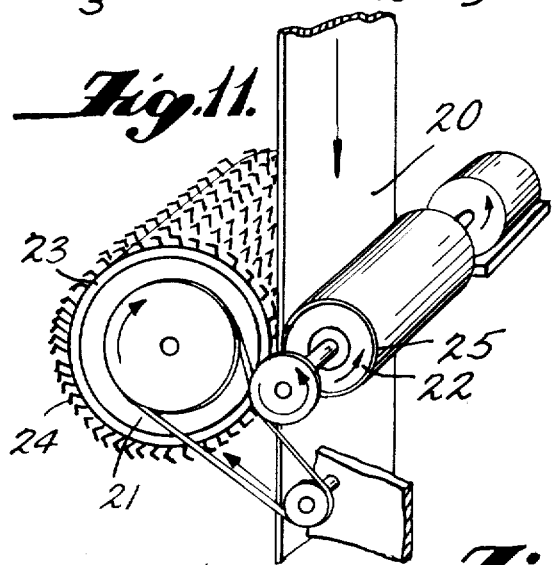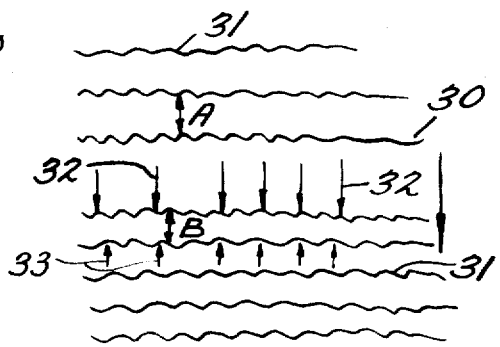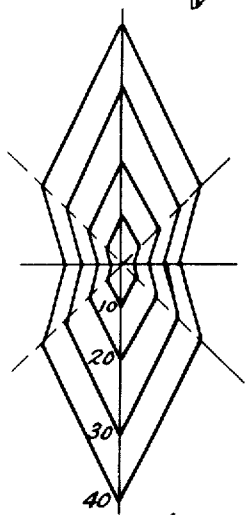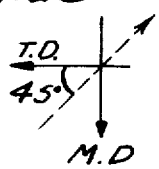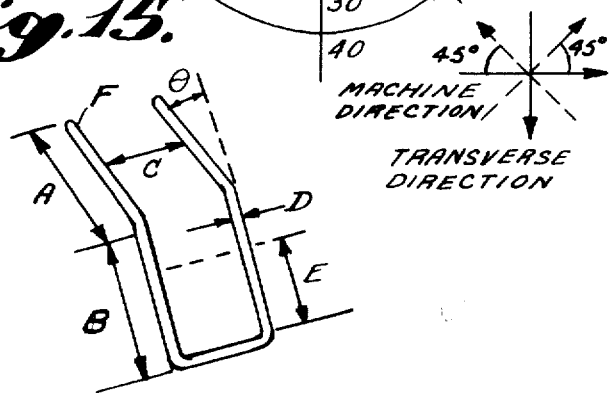

PRESENT MATERIAL

CONVENTIONAL ARTIFICAL LEATHER

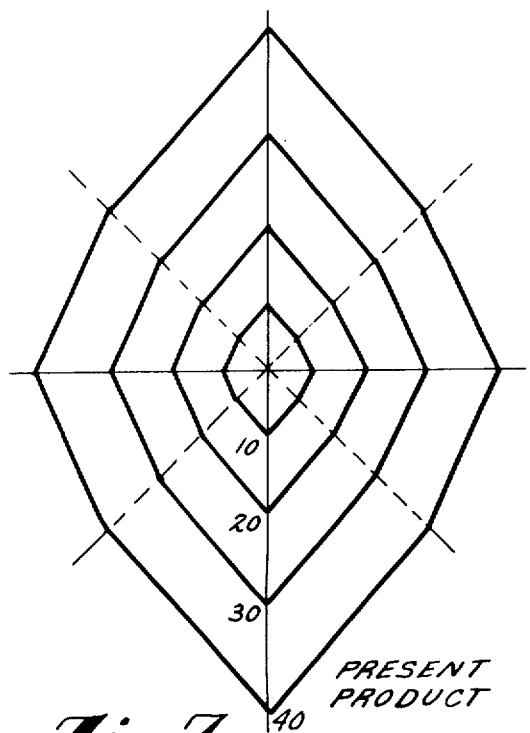
Fig. 7. PRESENT PRODUCT
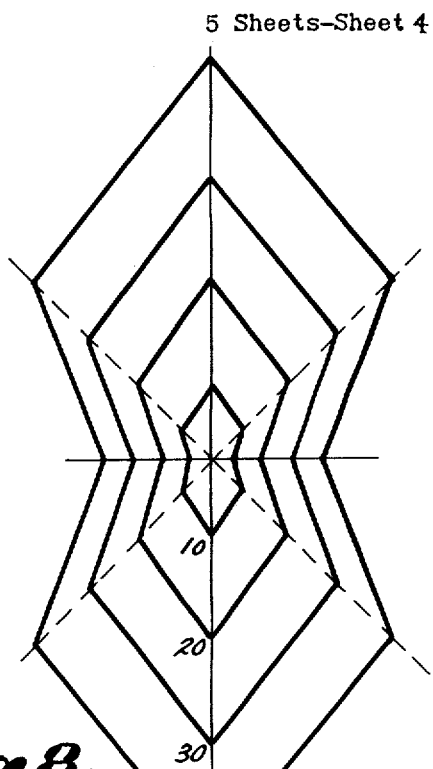
Fig. 8. PRODUCT A
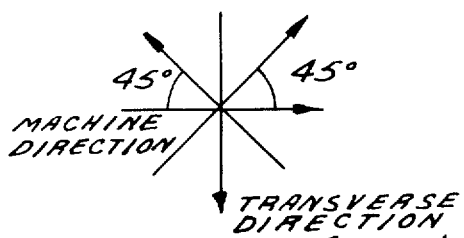
45° 45°
MACHINE DIRECTION
TRANSVERSE DIRECTION
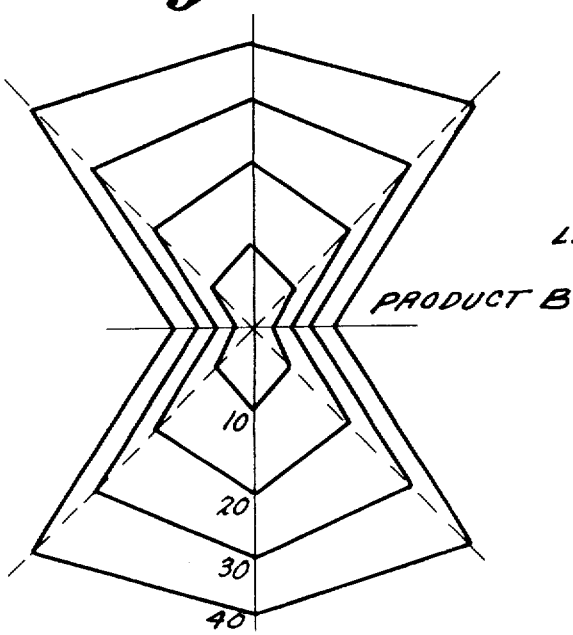
Fig. 9. PRODUCT B
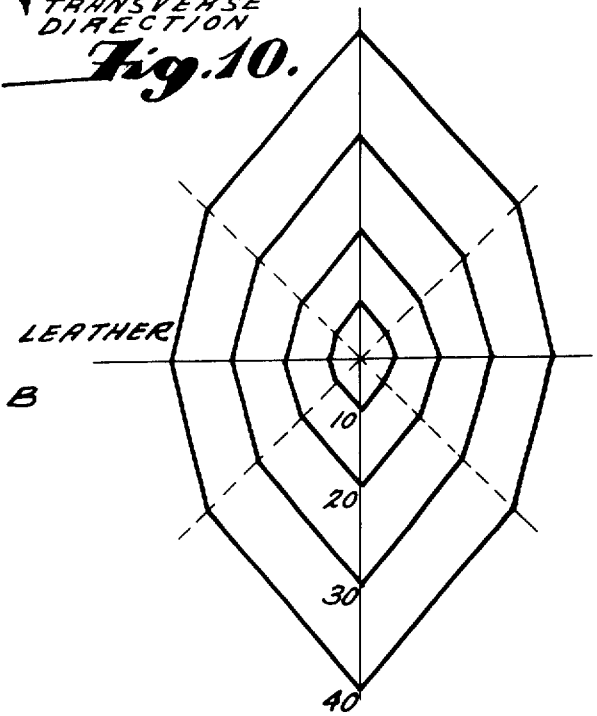
Fig. 10. LEATHER

LEATHER

PRESENT MATERIAL

FIRST COMMERCIAL ARTIFICAL LEATHER

SECOND COMMERCIAL ARTIFICAL LEATHER

3,817,820
NEEDLED TEXTILE FABRIC
Alexander M. Smith II, Elkin, N.C., assignor to The
Fiberwoven Corporation, Elkin, N.C.
Filed Jan. 28, 1972, Ser. No. 221,614
Int. Cl. B32b 5/06
U.S. Cl. 161—154          87 Claims

ABSTRACT OF THE DISCLOSURE

There is provided a needled textile fabric having high bulk density, entangled fibers, a controlled axis of flexure and a bulk density gradient increasing from the back surface to the face surface thereof. The products are made by needling layers of fibers having a needle pick-up gradient gradient into a dense structure, with a bulk density gradient. The needled fabric is finished with conventional leather and/or textile finishes. The fabric is suitable for use as an artificial leather.

The present invention relates to textile fabrics, and more particularly to textile fabrics for use in the production of artificial leather, especially for shoe upper materials.

BACKGROUND OF THE INVENTION

Natural leather has, until recently, been the primary material used in the production of shoe uppers. While leather has many properties which are desirable for shoe uppers, certain disadvantages thereof have caused difficulties in the production of shoes. For example, quality variation between hides and defects and differences within a hide vary the quality of shoe uppers produced from hides. Additionally, quality control of leather is difficult to achieve, and this renders somewhat unpredictable the quality of individual hides or a portion thereof. Considerable wastage also occurs in making shoes due to the irregular shape of hides.

For these and other reasons, considerable efforts have been made in the art to produce man-made leather substitutes for the production of shoe uppers. These substitute materials are commonly referred to, collectively, as artificial leathers, although this term is not completely accurate in that the substitute materials vary widely in their properties and some of the substitute materials have few properties in common with leather. In one respect, these differences between the properties of leather and substitute materials are the results of efforts to provide properties for shoe uppers which are not provided by leather, and, in another respect, these differences are the results of the inability of the art to reproduce certain of the desirable properties of leather.

Natural leather is, essentially, a fibrous material having bundles of fibrils which overlap and entwine to form a porous material. The fibrous structure of leather provides the desirable properties of flexure, suppleness, relatively high modulus, tear resistance and good tensile strength, which properties are important for providing a very wearable and durable material. Although leather is somewhat abrasion resistant, it is susceptible to scuffing on the surface and requires relatively frequent polishing to maintain a pleasing appearance. While the macroporous nature of the leather provides relatively high moisture transmission rates and liquid moisture absorption capacity, it also allows liquid water to penetrate through the leather, which requires the wearer of leather shoes to avoid getting the shoes wet.

In the efforts by the art to provide artificial leathers, considerable attention has been given to improving scuff resistance and to reduce liquid water transmission, thus obviating some of the disadvantages of leather in shoe uppers. Artificial leathers are, generally, compositions which contain substantial proportions of synthetic polymers, e.g., polyurethane or polyvinyl chloride, usually as a film on the outer surface of the artificial leather, and these compositions usually provide a relatively tough, water impermeable and chemical resistant polymeric outer surface. Artificial leathers of this nature have met with some success, but the consuming public has not accepted these artificial leathers as a general substitute for leather due to other undesirable properties thereof. Low cracking resistance with continued flexing of the artificial leather has presented a significant problem, and, in some cases of artificial leather, cracks will appear with only several months of wear. Also, while the artificial leather can present good scuff resistance, the material is often subject to peeling of the outer polymeric film as a result of relatively deep scuffs or cuts. This peeling cannot be effectively repaired by polishing, as is the case with leather. The consuming public has also been well aware of the relatively low moisture transmissions from the inside of the shoe made with artificial leather uppers, which results in an uncomfortable dampness on the feet of the wearer. This difficulty is accentuated with increased thicknesses of the outer polymeric film and with the total content of polymeric materials in the artificial leather composition.

While the above disadvantages are quite serious and have reduced the acceptance of artificial leathers, several other disadvantages have been of overriding difficulty and have severely restricted the acceptability of artificial leathers for a large segment of the consuming public. Films or layers of synthetic polymers, alone, have serious disadvantages in that they do not resist tearing, particularly when portions of a shoe upper are stitched together. Also, when the polymeric materials are sufficiently soft to provide an acceptable hand and feel, they are inherently so flexible and of so low modulus that they stretch and have little shape-retention ability (stability). Thus, it has been generally necessary to provide a composite of a polymeric film material and a reinforcing backing, which reinforcing backing gives extended wear to the shoe upper and provides shape retention properties. Additionally, the reinforcing backing is required to provide sufficient tensile strength of the material so that it is capable of being stretched over a shoe last without tearing or other related damage. Reinforcing backings are, generally, either a nonwoven textile or woven or knitted textiles or a combination thereof. A woven or knitted textile is sometimes positioned between the polymeric film and a nonwoven textile to make up a conventional artificial leather. Such a nonwoven textile is typically made by needling a mat of fibers and then splitting the needled fibers in planes parallel to the running length thereof to produce a plurality of "wafers" each having a thickness of about 1/32 to 1/16 inch.

The reinforcing backing material used with these artificial leathers, while necessary for the above reasons, has resulted in a material which is not yieldable in the manner of leather. The fibrous nature of leather allows the fibers to slip, relative to one another, under continued stress and thereby take a new permanent configuration, which is known as "set" in the art. The consuming public experiences this phenomena in the wearing of shoes and generally refers to the phenomena as "breaking in a new pair of shoes." As a new pair of leather shoes is worn, individual differences in foot shape apply stress to the leather uppers, and the fibers of the leather under this stress slowly slip relative to one another and take a set which conforms to the individual shape of the foot. After only a reasonable amount of wear, the leather has, in effect, been custom molded to the foot of the particular wearer and provides exceptional comfort to the wearer.

In addition, leather will take a set up to a maximum elongation or stretch. After that maximum stretch, the leather will further stretch only under considerable stress. Unfortunately, conventional artificial leathers with the relatively large proportions of polymer film and woven reinforcing backing have not provided these set properties of leather.

While some elasticity is provided in conventional artificial leathers, this elasticity does not result in a permanent set in the nature of leather. Conventional artificial leathers may be extended according to the individual shape of the foot during wear on any one day, but after the shoe is removed from the foot for a significant length of time, e.g., overnight, the artificial leathers return, essentially, to the shape originally provided in the manufacture of the shoe. This characteristic is known in the art as the "memory" of the artificial leather. Thus, the wearer is required to "break in" the shoes each day that the wearer uses the shoes, at least until sufficient wear during the day has been accomplished to once more extend the artificial leather uppers to conform to the particular shape of the individual foot. The degree of "memory" varies somewhat with various conventional artificial leathers, but all of the materials conventioanlly used suffer from the effects of memory. The effects of memory are particularly acute with thick polymer films and with backings which use a textile woven of tightly spun yarns. When the backing is in part a woven product, the strength of the artificial leather is greatly improved, but the woven textile in the backing makes the memory effect extraordinarily serious. Accordingly, discomfort is experienced by the wearer of conventionally backed artificial leather at least for part of each day that the wearer uses the shoes made thereof.

The degree of the discomfort, noted above, depends upon how closely the feet of the wearer approximate the shape of the particular shoes. If the wear's feet closely approximate the shape of the shoes, then this discomfort is minimized, but if the wearer's feet do not closely approximate the shape of the shoes, then this discomfort can be totally unacceptable. Thus, a proper fit of the shoes made with artificial leather is necessary in order that the shape of the shoes approximate the shape of the feet of the wearer as closely as possible. However, the accuracy of the fit, when purchasing shoes, is complicated by the degree of care exercised by individual shoe salesmen and by the practice in the art of limiting the number of sizes and widths of shoes to relatively small number. Thus, if a proper fit for an individual foot is not provided by a standard size or width and the buyer accepts a somewhat improper fit, then the discomfort noted above is accentuated.

In addition to the foregoing, the last used in forming shoes varies somewhat with the particular manufacturer and with the style of shoes. Thus, for example, a size 9–D in one style or from one manufacturer may fit a particular wearer whereas a 9–D in another style or from another manufacturer may not. While these differences, generally, are overcome by "breaking in" leather shoes, these differences can be critical with shoes made of artificial leather, and the confusion to the buyer in selecting a proper size accentuates the problem of obtaining the correct fit required for shoes of artificial leather. All of the foregoing is additionally complicated by the fact that the shape of feet changes during the day and during seasons, which can render a proper fit selected during the morning or in the winter an improper fit during the evening or in the summer.

A further serious problem of artificial leathers is the position of axis of flexure. The axis of flexure of leather is essentially parallel to and displaced toward the upper or face surface of the leather, as opposed to the center or the back surface of the leather. With the axis of flexure being near the face surface of the leather, as opposed to, particularly, the back surface of the leather, leather may bend with only relatively low face surface strains and is, therefore, able to withstand flex cracking of the face surface. Additionally, in walking, leather bends—grain inwardly—in a vamp of a shoe and the radius of curvature of the bent leather results in wrinkles on the face surface of the leather, commonly called the "break." A coarse "break" makes an unsightly appearance on the face surface while a fine "break" provides a pleasing appearance. A fine "break," e.g., up to about 20 wrinkles per inch, results from the flex axis being near the surface and connotes good quality leather. Converesly, a coarse "break," e.g., as low as 6 wrinkles per inch, is characteristic of "split" leather with a flex axis near the center of the material and indicates poor quality leather. Observing the "break" in leather has been a traditional customer test for good quality leather. Artificial leathers without a highly woven fabric near the face surface have not provided an axis of flexure sufficiently close to the face surface to provide a pleasingly fine "break" in the nature of quality leather.

Closely akin to break, is the folding in the vamp of a shoe, and the folding is related to the position of the flex axis of the material and the bulk density of the material of the vamp. As a wearer walks forward, the folds begin to form, and at the instant before the foot leaves the ground, the folds are at a maximum curvature. If the folds have large radii of curvature, then the amount of material in the folds becomes large and effectively reduces the amount of material forming the wearing length of the vamp, which correspondingly decreases the internal volume of the shoe. The wearer experiences this action as a tightening or pinching of the foot when the fold curvatures are excessive. Thus, in many artificial leathers, the radius of curvature of the folds have not been in an acceptable range. In some shoes of artificial leather, the break and fold in the vamp will be quite excessive and make the shoes both unsightly and uncomfortable.

One form of artificial leather has been made by laminating a relatively high modulus structure, e.g., a woven or knitted fabric, between a thick polymeric coating and a reinforcing backing. This approach, inherently, will somewhat shift the axis of flexure toward the face surface of the artificial leather, but the high modulus woven or knitted structure accentuates the problem of set, noted above, and correspondingly increases the discomfort experienced each day when the shoe is worn.

Artificial leathers also have suffered from very serious disadvantages in the manufacture of shoes. When shoes are made of leather, the cut leather (sometimes wet is stretched over the last in the forward direction toward the toe of the shoe. This stretching causes a contraction of the leather in the widthwise direction (across the vamp) and allows the latter to tightly conform to the shape of the last without bulges or wrinkles across the vamp. In effect, the leather has a relatively constant surface area under stress, i.e., if elongated in one direction it correspondingly contracts in the transverse direction and the elongated area is about the same as the area before elongation. Artificial leathers have not provided this property of relatively constant area under stress and it has been necessary to significantly complicate the traditional shoe making process with additional and difficult processing steps. Even with special patterns and special processing, it has not been possible to make certain styles and some shoes when removed from the shoe forming lasts lose their intended shape. These difficulties have severely limited the economic use of and number of styles produced with artificial leather.

As can be easily appreciated from the foregoing, artificial leathers suffer from numerous disadvantages, as opposed to leather, which have severely restricted the use of artificial leather. Most of the disadvantages are results of the inability in the art to provide artificial leathers with certain of the properties of leather. It would, therefore, be desirable to provide an artificial leather which provides such certain desirable properties of leather and which also provides the desirable advantages of conventional artificial leather.

OBJECTS OF THE INVENTION

It is therefore an object of the present invention to provide an artificial leather which closely approximates desirable properties of leather. More particularly it is an object of the invention to provide an artificial leather which allows a sufficient but limited permanent set with use by the wearer of shoes made therewith. A further object is to provide an artificial leather which does not require a woven or knitted textile as a part thereof. It is a further object to provide an axis of flexure very close to the face surface of the artificial leather and to provide a high bulk density thereof.

It is yet another object of the invention to provide an artificial leather which is scuff resistant, but which allows easy repair of scuffs with conventional waxes and polishes.

It is a further object to provide artificial leather which can be formed into shoes with use of conventional shoe-making processes and machinery and without any special additional processing or machinery modifications.

It is a further object to provide processes and apparatus for producing the present artificial leather.

Other objects will be apparent from the following disclosure and claims.

BRIEF SUMMARY OF THE INVENTION

Briefly stated, the foregoing objects are accomplished by providing a fibrous textile structure or fabric of high bulk density and controlled physical properties. The configuration of the fibers of the fabric allows the fibers to slip a limited amount relative to one another, with continued pressure in use, to provide a permanent set in the nature of leather. No woven or knitted textiles are required in the present artificial leather. The axis of flexure is near the face surface of the fabric and allows breaks and folds similar to leather, and which, therefore, provides comfort to the wearer and a pleasing appearance. Additionally, the fibrous structure provides good liquid absorption and vapor transmission through the material and prevents dampness on the feet of the wearer. The fabric also retains a relatively constant surface area during deformation stress, similar to leather; it also has directional moduli similar to leather. These properties allow the production of shoes on conventional shoe machinery. Other advantages of the present artificial leather will be explained hereinafter.

The fabric comprises textile fibers needled together into an integral structure with a face surface and back surface and having coherent fiber entanglement wherein the overall bulk density of the structure is at least 6 pounds per cubic foot, and the structure may have a bulk density gradient which increases from the back surface to the face surface. The bulk density gradient provides an axis of flexure which lies within about 0.4, preferably within 0.3, e.g., within 0.2 or 0.1, of the distance from the face surface to the back surface. Preferably, the overall bulk density is at least 8 pounds per cubic foot, especially at least 16 pounds per cubic foot and the ratio of bulk density at or near the back surface to the bulk density at or near the face surface is at least 1:2 and as high as 1:8, preferably 1:3 to 1:5.

The bulk density gradient may be in part provided by a needle pick-up gradient, e.g., a fiber denier gradient wherein the denier of the fibers decreases from the back surface to the face surface. Thus, the structure, before needling, may have a plurality of superimposed layers, each of which layers has different average fiber deniers so that the average denier of the fibers in the layers decreases with adjacent layers from the back surface to the face surface, and, after needling, the distinct layers are not substantially preserved but the decreasing fiber denier gradient of the structure is substantially preserved. The deniers of the fibers in the layers may vary from ½ to 8, e.g., to 5 denier.

The needle pick-up gradient and, thus, the bulk density gradient may also be provided by the plurality of superimposed layers of different average fiber lengths where, prior to needling, the average fiber length decreases from the back surface to the face surface and defines a decreasing fiber length gradient, and, after needling, the decreasing fiber length gradient is substantially preserved in the structure. Fiber lengths of up to 4 inches, preferably from ¾ or 1 inch to 3 inches, may be used in building this gradient.

Additionally, at least one layer of relatively short fibers may be superimposed and needled on and into the face surface of the first needled structure. The relatively short fibers may have unstressed lengths of less than 1 inch, preferably ¾ inch and as low as ⅛ inch, e.g., ⅜ to ⅝ inch. Thus, the short fibers increase the bulk density at and adjacent to the face surface of the needled structure and in the resulting further needled structure define a dense region of bulk density higher than the bulk density of the remaining portion of the structure. Preferably, the axis of flexure will lie at least close to this dense region, and more preferably the axis of flexure will lie in this dense region.

Further, fibers of the structure at and adjacent to the face surface of the needled fabric may be shrunk, e.g., heat shrunk, and define a compacted region, after shrinkage, which extends into the structure a distance less than the thickness of the structure.

The fabric has open interstices between the fibers and preferably the interstices may have a filler, e.g., a conventional leather filler, disposed therein, although the same is not required. The filler is in a form of solid particles, and the particles are preferably in clusters of particles which are predominantly loosely bonded to the fibers of the structure. The amount of filler in the structure is insufficient to fill all of the interstices between the fibers of the structure, and the amount of filler in the structure corresponds to as little as 5% up to 200% of the weight of the fibers in the structure, but add-ons of 10% to 150%, especially 20% to 100% are preferred. The bulk density of the structure with the filler therein is preferably between 20 and 45 pounds per cubic foot, The filler impregnated fabric may be buffed or sanded on the face surface and/or back surface whereby the surfaces are cleaned, smoothed and rendered suitable as a finished product or as a product for receiving a finish. The finish may be a conventional textile finish, e.g., a softener such as wax esters, polyethylene dispersions, or a conventional leather finish, e.g., a leather softener, such as a sulfonated oil or fat, pigments in hardening vehicles such as proteins (shellac of albumin), boiled linseed oil, acrylic polymers and polyurethanes.

The preferred fabric has fiber entanglement throughout to provide a predetermined overall modulus as well as other characteristics. At least part of the fibers of the structure at and adjacent to the face surface are shrunk, e.g., heat shrunk, to tighten the needled entanglement of fibers and define a region adjacent to the face surface having a higher modulus than the region adjacent the back surface. The shrunk fibers provide increased bulk density in that region and reduce the structure thickness with substantially no reduction in planar area. The fabric is preferably needled so that coherent fiber entanglement of said structure is accomplished wherein some of the fibers are oriented into closely spaced rows of fiber chain entanglement, the rows extending lengthwise of the structure. This preferred needled structure is known in the art as fiber chain entanglement.

In a preferred embodiment of the process a plurality of layers of fibers is superimposed on one another, e.g., by carding, to form a web of loosely matted fibers having an increasing needle pick-up gradient in the Z direction, i.e., from the back surface to the face surface, needling the web into an integral structure of cohering entangled fibers, wherein the needled structure has an overall bulk density of at least 6 pounds per cubic foot and has an increasing bulk density in the Z direction with a ratio of the bulk density of the back surface to the face surface in the range of at least 1:2 to as high as 1:8, preferably 1:3 to 1:5, and the axis of flexure lies at least within 0.4, e.g., 0.3 and especially 0.2 or 0.1 of the distance from the face surface to the back surface. The needle pick-up gradient and thus the resulting bulk density gradient is preferably accomplished by positioning the plurality of superimposed layers of fibers so that the average fiber denier decreases from the back surface to the face surface and/or is accomplished by positioning the plurality of superimposed layers of fibers so that the average fiber length of the layers decrease from the back surface to the face surface. Further bulk density is accomplished by laying on the face surface of this first so needled fabric a layer of relatively short, loosely matted fibers and then needling the layer of short fibers to increase the bulk density of the web to at least 8 pounds per cubic foot. Preferably, the needled fabric is thereafter wetted with a needling fluid and then further needled while wet to increase the bulk density to at least 12 pounds per cubic foot.

The structure is then relaxed to adjust the moduli in at least the machine direction and then densified by shrinking the fibers at least at and adjacent to the face surface. At least part of the fibers at and adjacent to the face surface are, therefore, at least in part shrinkable thermoplastic fibers and densification may be accomplished by applying heat to the face surface, optionally while maintaining the back surface of the structure relatively cool, although other conventional means of shrinkage, e.g., solvent shrinkage, may be used so long as the shrinkage is at or near the face surface. Pressure may also be applied in connection with the shrinkage step to further densify the structure.

The needled and shrunk fabric is preferably impregnated with a filler, e.g., an elastomer, to an add on of the dried and cured impregnated fabric of between 5% and 200% of the weight of the fabric to raise the bulk density. Thereafter, the cured impregnated fabric may be buffed or sanded on the face surface and conventional textile or conventional leather finishes are applied thereto, e.g., on the face surface.

For purposes of this specification, the terms "needle pick-up gradient" are defined as a gradient of fiber characteristics and/or needle characteristics which produce differential abilities of the fibers to be picked up by the barbs of a needle and needled into an entangled structure. Any differences in fiber characteristics which produce differential abilities of the fibers to be picked up by the barbs of a needle and entangled may be used to provide a "needle pick-up gradient." While needle penetration, barb depth, barb spacing and barb shape may be used to provide a needle pick-up gradient, with or without a fiber characteristic gradient, it is preferred that this needle pick-up gradient be provided, mainly, by the fiber characteristics such as differential fiber friction, fiber stiffness (modulus), fiber geometry, fiber surface, etc. For a detailed explanation of a suitable needle pick-up gradient see U.S. Pat. 3,206,351, which patent is incorporated herein by reference. The preferred fiber characteristic to provide the needle pick-up gradient is fiber geometry, e.g., fiber denier and/or length. The needle pick-up gradient is chosen so that the needles operate on the fibers to build a density gradient increasing from the back surface to the face surface.

DESCRIPTION OF THE DRAWINGS

FIG. 1 is an overall schematic flow sheet of a process according to the invention.

FIG. 2 is a diagrammatic illustration of a product of the invention.

FIG. 3 is a diagrammatic illustration of the disposition of the cured filler.

FIGS. 7 through 10 are typical planar stress-strain (modulus) diagrams of the present product, conventional artificial leathers, product A and product B, and leather, respectively.

FIG. 11 is a diagrammatic illustration of a means for relaxing the needled structure.

FIG. 12 is an idealized illustration of the movement of fibers caused by the action of the machine of FIG. 11.

FIG. 13 is a planar stress-strain diagram (modulus) of a fabric prior to treatment by the machine of FIG. 11.

FIG. 14 is a stress-strain diagram of an isotropic fabric as may be prepared by the machine of FIG. 11.

FIG. 15 is a detailed drawing of a suitable wire for use with the machine of FIG. 11.

DETAILED DESCRIPTION OF THE INVENTION

Figure 4:
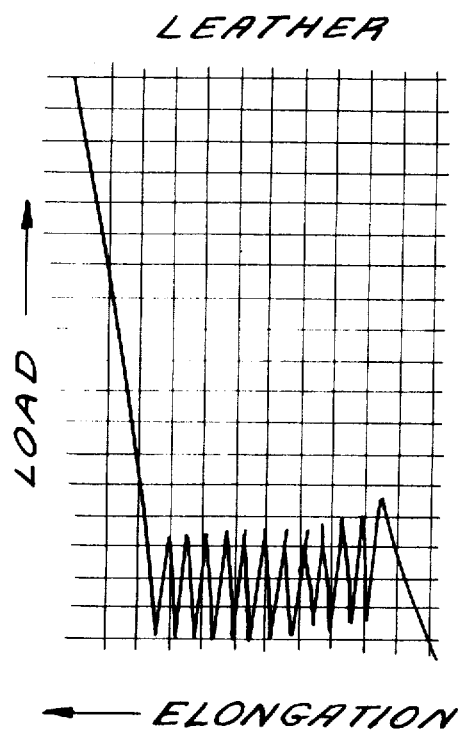
FIGS. 4 through 6 are typical stress-strain (modulus) diagrams of leather, the present material and conventional artificial leather, respectively.

FIG. 1 is an overall schematic flow sheet of a preferred embodiment of the process. Textile fibers, e.g., crimped polyester fibers, are carded on conventional carding machines, e.g., a woolen carding machine, to build up layers of carded fibers. In order to provide a needle pick-up gradient, the first layer is of a relatively coarse denier and of somewhat longer length than succeeding superimposed layers of fibers as shown in the drawing. While any number of superimposed layers of decreasing denier and/or fiber length may be used, three separate layers are suitable for building a density gradient in the resulting fabric. As shown in FIG. 1, for example, the first layer of three superimposed layers may have an average denier of approximately 4 with an average fiber length of 2¼ inch; the second layer may have an average denier of approximately 3, with an average fiber length of 1½ inch; and a third layer may have an average denier of approximately 1½ with an average fiber length of 1½ inch. However, deniers between about ½ and 8 and fiber lengths between ¾ and 4 inches (unstressed lengths of the crimped fibers) can be used in these layers of fibers. For convenience of manufacture, and for more efficient use of conventional machinery, it is preferable to build two separate composites of layers, the two separate composites being mirror images of each other, as shown by the carding station of FIG. 1. The two separate composites of layers are each cross laid on a conveyor and the composites are successively positioned to form a mat of the two superimposed composites. The mat may then be compacted by a conventional compacting roll and passed to a first needle loom. The mat of the two superimposed composites is needled in the first needling loom, which builds the overall bulk density of the mat and provides an integrity of each composite by fiber entanglement so that the mat can be split or pulled apart by conventional machinery (not shown) to produce two separate and essentially identical batts of needled fabric. After separating the two batts of needled fibers, the lower batt is reversed bottom to top and then proceeds through the process in a manner identical to the top batt. However, only one composite of layers may be carded and used in producing the first needled batt if desired, but in this case, the needle loom will, preferably, have only a top or only a bottom needle board since it is preferred that this first needling is performed from only one side of the composite of layers. In this first needling operation, relatively coarse needles are preferably used, e.g., needles of 24 to 36 gauge.

For example, 20 x 36 x 3¼ RB needles may be used, although needles with other than regular barbs are preferred, e.g., barb spacing of ⅛ inch to ¼ inch with barb throat depths of 5 mils or less. Further, relatively low penetrations of the composite of layers are used, e.g., foremost barb penetrations of just beyond the opposite face (e.g., up to about ⅛″ beyond). Or penetrations of about ⅞ to ½, e.g., ⅝ the thickness of the composite, may be used, although a small percentage of the needles, e.g., less than 30%, may penetrate all the way through the composite of layers to provide additional coherence for handling. In this first needling operation, at least 500 needle punches per square inch, especially between about 1,000 and 3,000 to 4,000 punches will provide a satisfactory degree of needling.

It should be noted in connection with the present process which uses a needle pick-up gradient that a needle with a given size barb will preferentially pick up and entangle fibers of lower denier. Also, shorter length fibers have greater mobility than longer length fibers and more readily enter into the entangling process after the structure begins to develop. Since the layers of fibers carded to provide the batt or batts for this first needling operation are of decreasing fiber denier from the first layer to the succeeding superimposed layers, the smaller denier fibers are presented to the needles of the needling machine at the surface of the batt. These smaller denier fibers can be picked up by the barbs of the needles and entangled at or near the surface of the batt in a more dense and compacted configuration than can be accomplished with the larger denier fibers in the layers thereunder. Therefore, in this first needling operation a bulk density gradient which increases from the back surface to the face surface has been accomplished, although at this point, the density gradient and the overall bulk density are not sufficient to provide the properties desired for the present textile fabric. The same mechanism operates in the succeeding needling operations to increase the overall bulk density and bulk density gradient. It should also be noted that the needle pick-up gradient can be provided by the choice of size and configuration, as well as spacing, of the barbs of the needles.

This first needling step may be accomplished with a conventional double needle board loom or a single needle board loom but when two mirrow image composites are used a double board loom is required.

After the first needling step, one or more layers of very short fibers, e.g., up to 2, e.g., ⅛ to ¾ inch in length and ½ to up to 2, e.g., up to 1½ denier, are placed on to the top of the needled batt. As shown in FIG. 1, two layers of short and fine denier fibers provide a very satisfactory result. The first layer placed thereon, e.g., carded with a wool carding machine, may have a higher denier than the second layer and, additionally, the first layer may have a longer fiber length than the second or topmost layer (this latter embodiment being satisfactory). However, the first layer of fibers carded on the needled batt may have both a higher denier and a longer fiber length than the second or topmost layer carded on the needled batt.

After carding the short fibers on the needled batt, the batt and layer or layers of short fibers are needled in a second needling operation. In this second needling operation, the barbs of the needles engage the short fibers and needle these fibers into the face surface of the batt. Since hte batt has already been needled in the first needling operation, and some bulk density increase and fiber entanglement were accomplished thereby, the batt presents resistance to penetration by the short fibers and the short fibers are needled into the batt, predominantly, at or just under the face surface of the batt. By thus disposing the short fibers at or just under the face surface of the batt, an additional bulk density increase is accomplished at or near the face surface with a corresponding increase in bulk density gradient across the thickness of the batt.

As in the first needling operation, conventional needles may be used, but it is preferred to use somewhat finer needles. Thus, for example, needles of 32 to 43 gauge are satisfactory, e.g., a 15 x 18 x 40 x 3½ RB needle may be used, although here again needles with other than regular barbs are preferred, e.g., barb spaces of ⅛ to ¼ inch with barb depths of 4 mils or less. In this second needling operation at least 2,000 needle punches per square inch are satisfactory, e.g., 4,000 and up to about 6,000 or 7,000 punches.

This second needling operation may be accomplished by any known needle loom, which may needle from either one or both sides of the structure. It will be appreciated, however, that the structure must be reversed, bottom to top, and needled on the reversed side when a loom which needles from only one side is used. The needles may be disposed at 90° to the plane of the structure or inclined at angles up to 30° thereto. However, it is preferred that the second needle loom be one which can accomplish fiber chain entanglement of the needled material. Fiber chain entanglement is a specific type of needling which produces an exceptionally strong needled product and which terms have an accepted meaning in the art. Generally, fiber chain entanglement is characterized by a large degree of fiber curvature, over-and-under orientation, interlooping and Z-direction chaining. A complete explanation and definition of fiber chain entanglement and a complete description of the fiber chain entanglement producing looms are disclosed in U.S. Pats. Nos. 3,112,552; 3,090,099; 3,090,-100; 3,112,549; 3,112.548 and 3,132,406 which disclosures are incorporated herein by reference. Fiber chain entanglement needling is referred to in the art by way of the trademark Fiberwoven or Fiberwoven looms, and for convenience in this specification, that terminology will be used hereinafter.

With the second needling, the overall bulk density of the needled product becomes quite high and the fiber entanglement accomplished produces a needled fabric of considerable strength and integrity. The product from the second needling step has sufficient properties, e.g. bulk densities of at least 8 pounds per cubic foot to allow its use for various purposes such as a garment backing and the like, as well as for an artificial leather, but it is preferred that the fabric be further densified by yet a third needling operation.

As noted above, the product from the second needling operation is quite dense, and this dense fabric presents considerable difficulty in performing yet a third needling operation thereon. Since the fibers of the needled fabric are closely entangled, especially at the face surface, considerable resistance is presented to the penetration of needles in a further needling operation. In order to mitigate the difficulty of this further third needling, it is preferred that the needled fabric be first treated with a needling fluid which is a surface active and/or thickening agent, such as a concentrated aqueous solution of a wetting agent, soap or thickening agent. Preferably the fabric is completely soaked with the fluid. While the phenomena provided by the needling fluid is not fully understood, it appears that the fluid, especially in combination with essentially fabric saturation amounts thereof, accomplishes a physical state in the dense needled fabric which allows penetration of the needles in the third needling operation without the third needling operation ripping, tearing and otherwise destroying the configuration and fibers of the fabric. At least, the needling fluid enables the continuation of the needling to provide higher densities and more intimate fiber entanglement than is possible without such an aid. Thus, as shown in FIG. 1, the needled fabric from the second needling step is preferably padded with a concentrated aqueous solution of a wetting agent, soap or thickening agent and then passed through nip rolls to remove excess of the solution prior to being needled in the third needling step. As a specific example, a satisfactory needling fluid is provided by a 10% water solution of Penetrant GWX (Woonsocket Color & Chemical). Penetrant GWX is principally a coconut oil salt. As another example, a 1.0% water solution of locust bean gum (Solvatose 260) is satisfactory.

As in the second needling operation, it is preferred that the third needling operation be performed by a Fiberwoven loom, although here again, a conventional loom may be used. In the third needling operation, the final overall bulk density and bulk density gradient, which is to be provided by needling, is accomplished. Hence, the third needling step should perform sufficient needling to raise the overall bulk density of the fabric to within the present preferred relatively high bulk densities. Thus, needling densities of at least 6,000, especially between 10,000 and 20,000, e.g., 10,000 to 14,000, needle punches per square inch will provide these high bulk densities and entanglement. In any regard, it is preferred that the needling be sufficient to provide an overall bulk density of at least 12 pounds per cubic foot, and more preferably at least 13 or 14 pounds per cubic foot. This third needling operation can readily accomplish overall bulk densities of 15 pounds per cubic foot and with sufficient needling overall bulk density of 16 to 18 pounds per cubic foot and up to 20 or 21 pounds per cubic foot can be obtained. As can be readily appreciated, this is an extremely dense needled product and is far more dense than conventional needled products. To accomplish these high densities, multiple passes through conventional needle looms will normally be required. For example, a standard fiberwoven loom has four sets of top and bottom needle boards and at least two, preferably at least three passes through the loom will be required. However any number of passes to achieve the foregoing densities may be used. Also, as can be easily appreciated, while three needling operations have been described above, the needling may be carried out in less than three or more than three operations, so long as the final accumulative needling densities and final overall bulk densities and entanglement, as described above, are accomplished. However, for convenience and ease of operation about three or four separate needling operations are preferred.

In both the second and third needling operations, the foremost barb of the needles of one needle board will penetrate the fabric from the face surface to well toward the back surface and preferably until the foremost barb is just at or just through the back surface. Likewise, the needles of the second needle board will penetrate to well within the fabric and preferably until the foremost barb is just to or just through the face surface.

In each of the needling operations, it is preferred that the composite be fed into the needling looms with a minimum amount of tension consistent with feeding the composite through the looms in a uniform manner. This minimum tension will provide two desired results. Firstly, the fully needled fabric will have less machine direction length increase over the length of the original composite. Secondly, the minimum tension will allow some degree of freedom for random movement in the transverse direction as the composite passes into and through the needle looms. This random transverse movement improves the effectiveness of the needle operations.

As will be illustrated hereinafter in connection with Example 1, the low barb penetrations and high degree of needling produce a needled fabric of unusual characteristics and form a feature of the invention.

Of course, during the three needling operations described above, the overall thickness of the needled fabric decreases with each needling step (as indicated in FIG. 1). Hence, the amount of fibers forming the various layers prior to the first needling operation and the amount of short fibers added prior to the second needling operation should be consistent with ultimately producing a needled fabric in the third needling step with an overall bulk density of at least 12 and especially 14 to 18 pounds per cubic foot and with the desired thickness of the final needled product. The calculation of the required amount of various fibers to produce any desired final needled thickness is well within the skill of the art. However, final thickness between $1/32$ and $3/16$ inch are preferred, especially between $1/12$ and $1/24$ inch, e.g., $1/16$ inch.

After the third needling step, the needled fabric is then washed in a conventional manner to remove the needling fluid added to the fabric prior to the third needling step unless the needling fluid can acceptably remain in the fabric consistent with an intended use. After drying the washed fabric in any conventional manner, including heated cans, hot air or superheated steam ovens, infrared ovens and the like, the needled fabric is essentially completed insofar as needling operations are used to provide the desired overall bulk density and bulk density gradient.

However, in order to accomplish yet a further increase in overall bulk density and especially to increase the bulk density gradient, the fabric is processed to accomplish a shrinkage of the fibers at least at or near the face surface of the needled fabric. It is important that the fibers of the fabric structure be essentially relaxed prior to this shrinkage step, since otherwise the tensions in the fibers resulting from the prior processing steps will prevent the required degree of shrinkage and the required modulus of the resulting fabric. With the fibers of the structure being relaxed, the surface shrinkage will not produce significant planar shrinkage of the needled fabric.

In view of the above, and additionally for the reasons which follow, prior to the shrinkage step the fabric is treated in such a manner as to loosen the fibers so that they are not significantly stressed by one another, i.e., they are relaxed. In one aspect, the pulling of the fabric through the needle looms sets up a machine direction stress and accordingly, a machine direction modulus which is considerably higher than the transverse or widthwise direction modulus. The machine direction and transverse modulus are, therefore, unacceptably out of balance for use of the fabric as an artificial leather and a relaxing of the fibers in the machine direction is required. A relaxation of the fibers in the machine direction can be achieved by simply over-feeding the fabric through a conventional tenter which will stretch the fabric widthwise and therefore allow the fabric to relax lengthwise. After passing through the tenter, the widthwise dimension of the fabric will be greater than the dimension prior to tentering, but after a period of time, the widthwise dimension will return, essentially, to the original dimension. However, to hasten this return to, essentially, the width dimension prior to tentering, the fabric may be heated, e.g., by hot air or a flame, to temperatures below significant shrinkage temperatures of the fibers. This heating will provide more mobility to the fibers and also immediately return the fabric to the widthwise dimensions, essentially, prior to tentering. Hence, the net effect of the tentering and heating steps is to accomplish a decrease in length in the machine direction of the fabric and, correspondingly, a loosening of the fibers of the structure. The transverse stretch in the tenter should be sufficient to decrease the machine direction modulus to approximately the same as the transverse modulus, e.g., the ratio of the machine direction modulus to the transverse direction modulus is no greater than 2:1, preferably less than 1.5:1, e.g., less than 1.2:1 or 1.1:1. Simple modulus tests can establish the correct widthwise stretch for any particular needled material.

Another method for relaxing the machine direction stress is that of passing the fabric through the nip of two rolls, at least one of which has a wire-like surface. When only of the rolls has a wire-like surface, the other roll should have a friction surface, e.g., sand impregnated rubber and the like. This latter embodiment is shown in FIG. 1. The friction roll has a peripheral surface speed different than the peripheral surface speed of the wire roll, e.g., a peripheral surface speed between 10% and 45% different. By passing the fabric in the machine direction through this nip, in a single pass or multiple passes (or through a plurality of nips between a plurality of rolls), the wires of the one roll will work the structure in a mechanical manner to loosen the fibers in the machine direction. A decrease in the length (machine direction) of the fabric will be accomplished and this decrease will be chosen so that the resulting balance of machine direction and widthwise modulus are as desired, and, preferably for purposes of the present fabric for artificial leather, so that these moduli, essentially, corresponding to the head to tail and transverse moduli of leather, e.g., at least so that the ratio of the perpendicular moduli is no greater than 1:2, especially no greater than 1:1.5.

After relaxing the structure and adjusting the machine direction modulus, as explained above, fibers at least on or near the face surface are shrunk. While chemical shrinkage in a known manner may be used, it is preferred that the fibers be heat shrunk. All of the fibers of the structure may be heat shrunk and the structure may contract in the Z direction, with or without substantial planar contraction of the structure, but it is preferred that the shrinkage be without substantial planar contraction of the structure and the shrinkage of the fibers be, mainly, at or near the face surface only. Thus, the preferred embodiment may be accomplished by heating the face surface of the fabric, optionally while cooling the back surface thereof. This can be accomplished by a blast of hot air on the face surface for a duration sufficient to heat and shrink the fibers in a region at, and adjacent to, the face surface, but insufficient to heat and shrink the fibers below this region adjacent to face surface. Thus, in the preferred embodiment heat is applied in such a manner that only the fibers at or near the face surface are heated sufficiently that shrinkage will occur and the fibers toward the middle and near the back surface will not be sufficiently heated to cause any substantial shrinkage thereof. Therefore, conveniently, the face surface is heated while the back surface is cooled in order to ensure this required differential heating.

The shrinkage at the face surface, thus, further compacts a region close to the face surface and accomplishes a corresponding increase in bulk density of that region. This shrunk and compacted region near the face surface further builds a bulk density gradient across the thickness of the fabric.

A preferred method of accomplishing the heating and shrinkage at or near the face surface, as described above, is to pass the relaxed fabric between two continuous travelling belts, e.g., metal belts, the top belt being heated to a temperature sufficiently high to shrink the fibers at or near the face surface and the bottom belt being cooled or otherwise maintained, e.g., due to its mass and the like, at a temperature consistent with preventing heating of the fibers toward the middle and at the back surface of the fabric to a temperature which will allow shrinkage. The top belt is heated to above the heat shrinkage temperature of the fibers, preferably at least 10° F., e.g., at least 50° or 100° F. above the minimum heat shrinkage temperature. Generally, temperatures of at least 300° F. and up to 700° F. will be required for most fibers. The bottom belt is kept, preferably, at least 10° F., e.g., at least 50 to 100° F. below the minimum heat shrinkage temperature. For example, with low shrinkage polyester fibers, the top belt is suitably heated to 475° F. while the bottom belt is maintained at a temperature of about 175° F. or lower. When a combination of an upper and lower travelling belt is used, this step may also accomplish a further overall densification of the fabric by applying pressure on the fabric during the heating step. Pressures up to 60 to 75 pounds are suitable for this purpose. The material should be cooled, e.g., to 175° F. or less, prior to release of the pressure thereon and this can be accomplished simply by heating only a forward portion of the travelling belt or providing a positive cooling means, e.g., an air blast or water spray, in the rearward portion of the travelling belt or belts. Accordingly, the use of travelling belts, as described above, as opposed to other means of heating where pressure cannot be applied, is a preferred embodiment of the invention and is diagrammatically illustrated in FIG. 1. Preferably, the shrinkable fibers at or near the face surface will be shrunk between about 5 to 25% on an average basis. The belt press also can prevent substantial planar shrinkage of the structure, i.e., planar shrinkages of less than 10%, and for this additional reason is a preferred method of accomplishing the shrinkage.

After the shrinkage step, the fabric has been fully densified and will have, suitably, an overall bulk density of about at least 14 pounds per cubic foot, and preferably at least 16 pounds per cubic foot. With the use of travelling belts, exerting pressure on the fabric, densities greater than 17 pounds per cubic foot, in the range of 20 to 30 pounds per cubic foot, can be easily obtained. For example, a bulk density of about 24 pounds can be readily accomplished.

The textile fabric is then of suitable properties for use as an artificial leather, but in order to provide a hand and feel an even greater density for support of a surface finish, the fabric is preferably impregnated with a filler, although the use of a filler is not required.

The filler may be any inert solid, either organic or inorganic which contributes to the overall bulk density of the structure, e.g., finely divided inorganic fillers such as bentonite, chalk, kaolin, talc, clays, asbestos, diatomaceous earth, silica flour, mica, magnesium silicate, zeolites, carbon black, zinc oxide, barytes, ferric oxide and the like. Preferably, the inorganic fillers are loosely bonded to the fibers of the structure with an adhesive, especially an elastomeric adhesive such as plasticized polyvinyl chloride, natural rubber, butadiene rubbers, polychloroprene rubbers, polyurethane rubbers, silicon rubbers, etc. Also, the filler may be an organic material such as a natural polymer, e.g., collagen or a synthetic polymer or copolymer such as acrylonitrile polymers, silicone rubbers, chlorosulfonated polyethylene, polyethylene and polypropylene, plasticized polyvinyl chloride, Kel-F type copolymers of tetrafluoroethylene and chlorotrifluoroethylene, fluorosilicone rubbers such as Silastic LS 35, poly(alkylene oxide) polymers and natural rubber or any of the conventional leather fillers.

The loosely bonded particles of filler provide additional suppleness, density and shape retention to the structure and also prevent collapse of the interstices between individual fibers. Accordingly, it is preferred that the filler be elastomeric in the nature of conventional leather fillers. Generally, elastomers will have a Shore A hardness of about 40 to 90, a modulus of about 200 to 4,000 p.s.i. at 100% to 300% elongation, and a brittle temperature of at least —10° C. (brittle temperature approximates the glass-transition temperature). Any of the natural and synthetic elastomers may be used, including polymers and copolymers of butadiene, isobutylene, butene and pentene, polysulfides, polychloroprene, polyesters, e.g., the Paraplex and Norepol rubbers, polyurethane and copolymers of alkyl acrylates with vinyl ethers. Natural rubber is a preferred filler since it meets all of the required elastomer properties, is inexpensive and easy to use. Natural rubber is vulcanized for use as the present filler and any of the conventional vulcanizing agents may be used such as sulfur compounds, peroxides, diazoaminobenzenes, tetraalkylthiuram disulfides, bisthiol acids and salts, quinones, imines, oximes, anilines, thiazides and phenols in the presence of oxidizing agents, and azodicarbonamidines. Conventional accelerators such as thiazoles, dithiocarbamates, aldehydeamines and guanidines may be used in vulcanizing the natural rubber, along with conventional antioxidants and other conventional compounding ingredients (see Fisher, Harry L., Chemistry of Natural and Synthetic Rubbers, Reinhold Pub. Corp., New York, 1957).

The method of impregnating the filler can be as desired and any of the conventional procedures may be used, including solvent deposition, in situ polymerization, and the like, but for convenience and simplicity, it is preferred to simply impregnate the fabric by padding to the correct add-ons with a pad and nip. This method is especially convenient when a latex, e.g., natural latex, is used as the filler elastomer. Thereafter the elastomer latex is precipitated or coagulated. Any conventional means of coagulation may be used, but it is preferred to coagulate the latex with steam, e.g., of up to about 6° F. superheat, since an additional advantage is obtained thereby.

In this latter regard, it has been found that when the latex is coagulated with live steam, the precipitated solid particles of the latex form in adhered clusters, somewhat similar to a cluster of grapes, and that after curing and drying, these clusters are predominantly only loosely bonded to fibers of the fabric. With this predominantly loose bonding of the clusters of latex particles, the resulting structure is soft and may be mechanically worked, in the same manner as leather is worked, to further improve the drape and hand.

Thereafter, the latex impregnated fabric is cured and dried. The curing and drying temperatures will be those consistent with the particular latex being used, all of which is well known in the art. However, for example, temperatures for natural latex between 200° F. and 300° F. and times between 10 minutes and 30 minutes are satisfactory. Curing may be accomplished with the live steam coagulation step.

After curing and drying the impregnated fabric at conventional temperatures and times, the fabric may be finished as desired, but conveniently, conventional textile and leather finishes are applied thereto. In this regard, sizings, softeners and like textile finishes, and grain improvers, tie coats, top coats and like leather finishes may be applied to the textile. For example, the fabric may be sanded or buffed, to clean and smooth the surface, as is conventional in the leather art, and a conventional acrylic leather finish may be applied thereto, preferably after a filler coat of low molecular weight acrylic, polyurethane or the like is placed on the fabric, as conventionally practiced with leather finishes. The leather finish may then have a water-resistant coating and/or pigment-containing finish, such as a nitrocellulose lacquer coating, applied thereto and again as conventionally practiced in the leather art. Additionally, a textile fabric softener may be applied to the back surface of the finished fabric so as to improve the hand, drape and feel thereof. Of course, the fibers or impregnant or both may be colored or dyed similar to treatments of leather with pigments and textile dyes.

After application of the finish and/or other coatings, as described above, the product is dried, if required according to the particular finishes, at elevated temperatures, or the like, and then is ready for embossing to any particular surface which is desired. For example, the surface may be embossed to that resembling a fine-grained calf skin, a reptile leather, a crushed grain type finish, or an ornamental design, if desired. Any conventional leather or artificial leather embossing press may be used, and the platens of the press will have a pattern therein consistent with the pattern desired. The embossing temperatures, pressures and times are not critical and it is only necessary that sufficient conditions be used to accomplish an embossing on the surface to the depth desired. For example, with conventional acrylic leather finishes, embossing pressures of about 25 pounds per square inch up to about 500 pounds per square inch may be used, with temperatures between 150° F. and 400° F. Within this range of temperature and pressure, times of as little as 10 seconds may be used, but it is preferred that longer times, e.g. 20 seconds up to three minutes be used in order to fully emboss the desired design on the fabric. Of course, the product is cooled after embossing.

After the embossing operation, the product is cut to desired lengths and is ready for fabrication into shoe uppers and like artificial leather goods.

The type of product resulting from the foregoing process can be illustrated by the diagrammatic drawing of FIG. 2. The fabric will have a face surface region of high bulk density 1, a back surface region of low bulk density 2, and be made of entangled needled fibers 3. The bulk density will increase from the back surface 2 to the face surface 1 and this increase is illustrated as regions 4 through 7. Thus, the bulk density of region 5 will be greater than the bulk density of region 4, and likewise the bulk density of region 6 will be greater than 5 and region 7 will be greater than 6. As an illustration, if one were to measure the bulk density of the material (without filler therein) just at or near the back surface, the bulk density would fall within a range of about 6 to 10 pounds per cubic foot. Likewise, the bulk density in region 4 would be about 10 to 14 pounds per cubic foot; the bulk density in region 5 would be about 14 to 16 pounds per cubic foot; the bulk density in region 6 would be about 16 to 22 pounds per cubic foot; the bulk density in region 7 would be about 22 to 26 pounds per cubic foot; and the bulk density at or near the face surface would be about 26 to 30 pounds per cubic foot. With filler in the above noted ranges each of the foregoing bulk densities would be increased about 2 to 20 pounds per cubic foot. It is to be understood that the foregoing bulk densities are for illustration purposes only and it should be clearly understood that the present invention has greater latitude than the narrow ranges noted in that illustration. By so building a structure with a bulk density gradient, in the nature described above, the axis of flexure is shifted from the center line of a cross section of the structure to near the face surface, and the axis of flexure 8 is illustrated in FIG. 2 at near the face surface.

FIG. 3 is a diagrammatic illustration of the disposition of a latex filler in the structure, as could be viewed by a microphotograph thereof. In FIG. 3, the individual fibers 10 make up a network of entangled fibers and among and on the fibers, particles of cured latex 11 are disposed in clusters 12 of individual particles. While the latex contacts and touches the fibers 10, the latex is loosely bound onto the fiber, generally in clusters as shown, and incompletely fill the interstices between the fibers. Thus, the structure remains open and porous, while at the same time the overall bulk density of the structure is increased by the presence of the latex and the latex provides some resiliency and stability to the structure. The latex should be precipitated from the suspension of the latex particles and cured in such a manner that the latex does not tightly bond to the fibers of the structure. In this regard, it has been found that precipitating the latex with live steam, as noted above, is well suited for this purpose, although other means of precipitation may be used.

Figure 5:
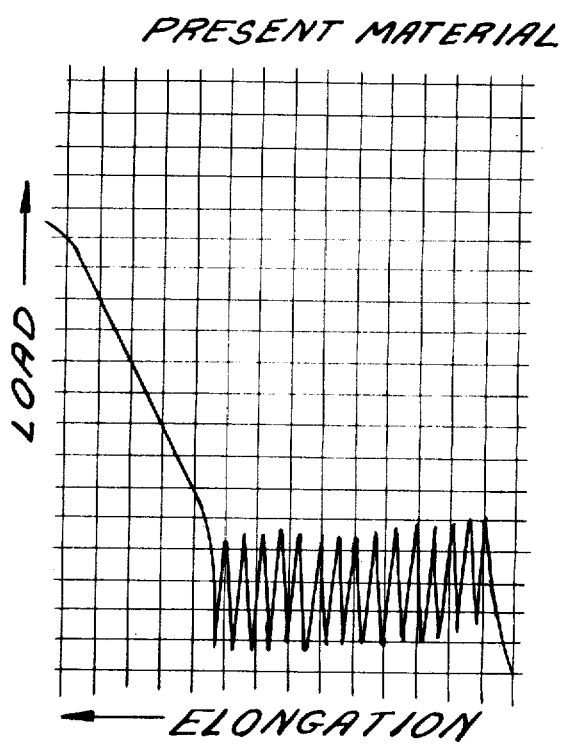
Figure 6:
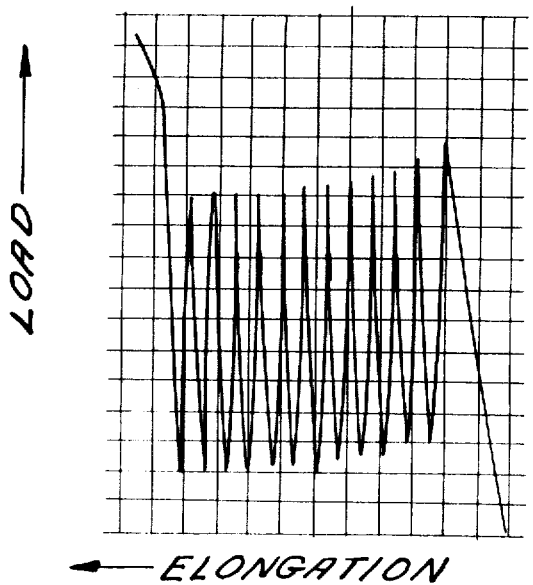
Figure 16:
FIG. 16 is a microphotograph of a cross section of leather.
Figure 17:
FIG. 17 is a microphotograph of a cross section of the present material.
Figure 18:
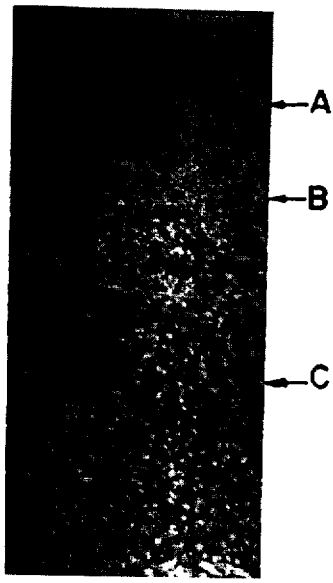
FIG. 18 is a microphotograph of a cross section of a first commercial artificial leather.

As a result of the foregoing process, the product produced thereby exhibits many properties quite similar to that of leather. Among these important properties is that of modulus and FIGS. 4 through 6 show a typical modulus for leather, the present material and conventional artificial leather. FIGS. 4 through 6 are illustrations of stress-strain curves wherein the sample is extended from a normal length of 3 inches to 3½ inches, relaxed to 3¼ inches and then cycled in that manner for approximately 12 times. Thereafter the sample is extended until break, the break not being shown on the stress strain diagram. As can be seen from comparing FIGS. 4 and 5, the increase in load required to extend the sample from 3¼ inches to 3½ inches is quite similar for both leather and the present material. However, the load required to extend a sample of conventional artificial leather having a woven fabric backing layer from 3¼ inches to 3½ inches is considerably greater than that of either leather or the present material. Thus, the modulus of the present material is quite similar to leather, while the modulus of the conventional artificial leather is considerably different from and much higher than that of the present material or leather.

Just as importantly, the modulus in the various directions of the material should enable the material to function in a manner similar to leather when being fabricated into a shoe upper, and especially the artificial leather should have moduli which will allow the drawing over a shoe last. FIGS. 7 through 10 compare the modulus in the machine, transverse and 45° directions of the present material to conventional artificial leathers (product A and product B) and leather. These figures illustrate the modulus as determined with an Instron tensile machine using a cross-head speed of 1 inch per minute, a chart speed of 20 inches per minute, with a full-scale load of 40 pounds and a strain rate of 40% per minute. The sample size was 1 inch by 2½ inches. The elongation at loads of 10, 20, 30 and 40 pounds was determined in each of the machine direction, transverse direction and 45° direction. The results of those data are plotted at FIGS. 7 through 10. As can be seen from comparing FIG. 7 (the present material) with FIG. 10 (leather), the modulus of the present material in the machine, transverse and 45° direction is quite similar to leather, while the modulus in those same directions for product A and product B are considerably different. Note particularly the great differences in modulus of products A and B in the machine direction as compared to the transverse direction.

Leather has a slightly higher modulus in the head to toe direction of the hide and this slightly different modulus is advantageously utilized in producing shoes. Thus, the hide is cut so that when the leather is stretched over the vamp of the last, toward the toe of the shoe, the leather also contracts across the vamp of the last and can, therefore, be snugly pulled over the last in a tight-fitting configuration. This allows the vamp of the shoe to be made without folds or wrinkles or without any additional processing, as discussed before in this specification. In contrast thereto, conventionally produced artificial leathers do not have modulus characteristics similar to leather and when pulling the conventional artificial leather over a last to produce the vamp, the artificial leather does not contract across the vamp of the last and leaves unsightly folds and wrinkles. Thus, it is necessary to eliminate these folds and wrinkles by excessive stretching and/or pre- or post-thermal molding processes with the attendant expense thereof, as noted hereinbefore. Deep draw lasts cannot be conveniently used since the conventional artificial leather cannot pull across the last in the nature of leather; in many cases even with further processing, the shoe would be commercially unacceptable. The present material, however, does not suffer from the disadvantages of conventional artificial leather in that it has a modulus quite similar to that of leather and can be formed on a last in the same manner as leather, and no auxiliary processing or special considerations must be followed when using the present material.

In regard to stretching a shoe upper material over the vamp of a last, an important property of leather in allowing a tightly fitted vamp area is that of an essentially constant surface area while deformation takes place under stress. A constant area under stress can be defined as the property wherein a material elongated in a first direction contracts in the transverse direction so that the planar area is substantially the same as the planar area prior to elongation, i.e., the area remains the same within ±5%. A material can be tested for constant area under stress in the following manner. A one inch wide strip of the material is marked with a circle of one-half inch diameter. The strip is then elongated by 30%. With the elongation of the material, the circle will take the general configuration of an ellipse. If the area of the ellipse is substantially the same as the area of the circle prior to elongation, then the material has the property of constant area under stress. Leather has a constant area under stress and the area of the ellipse on elongated leather is very close to the area of the originally marked circle prior to elongation. Of course, the area of the ellipse may be, substantially, the area of the circle only if the material contracts in the direction transverse to the direction of the elongation. In other words, the minor axis of the ellipse must always be less than the diameter of the originally marked circle in order for the material to have a constant area under stress.

As a comparison of the foregoing, tests were conducted on polyurethane film, a commercial artificial leather, the present material and a standard shoe upper leather. Each material marked with a ½ inch circle, was elongated 30%. This elongation caused the diameter of the circle, in forming the minor axis of the ellipse, to decrease by the following percentages for each material; polyurethane film 5%; a commercial artificial leather 15%; the present material 25%; and a shoe upper leather 26%. Thus, shoe upper leather maintains a relatively constant area under stress and the present product closely approximates that property of leather, while the conventional artificial leather deviates considerably from constant area under stress and the polyurethane film has essentially no property of constant area under stress. It is also noted that the force exerted in the transverse direction, during elongation of the present material, is within about ±5% of the force exerted in the transverse direction with leather. In this specification a material which has a relatively constant area under stress is defined as one which, when elongated 30%, has an area under elongation which is within ±8%, preferably within 5% of the area prior to the elongation.

Accordingly, when the present material, similar to leather, is stretched over the vamp of a shoe last from heel to toe, that stretching force also causes a considerable contracting force across the width of the vamp. This allows the present material, in the same manner as leather, to be snugly and tightly pulled across the vamp of the shoe last without unsightly bulges and the like, as opposed to conventional artificial leather.

It is emphasized that the unique properties of the present material result from a combination of characteristics built into the textile fabric. Thus, the overall high bulk density, the bulk density gradient and highly entangled nature of the needled fabric all contribute to the properties of the present material. The needling procedure arranges the fibers into a highly entangled network wherein a large percentage of the fibers in the body of the structure are oriented in the Z direction, while at the same time fibers near the face of the structure are densely entangle with their primary axis largely oriented in the plane of the structure. The interrelationship between the needled fibers closely approximates that of leather. This is accomplished by the use of the needled pick-up gradient, by the large number of relatively low penetration needle punches and by the graduated increase in the intensity of needling, i.e., reduced spacing between successive penetrations of a given barbed needle, as well as in the preferred embodiment by needling with the Fiberwoven technique. In a general sense, the present artificial leather depends primarily upon the physical characteristics of the textile, as opposed to primary reliance upon laminations of textiles and polymers in commercial artificial leather.

An important operation in producing the present textile fabric, as discussed above, is the relaxation prior to the differential shrinking step. In FIG. 1, this step is noted as the mechanical relaxation step. While the general operation of the mechanical relaxation step is discussed above, specific details as to the construction of that machine is given below.

FIG. 11 shows a diagrammatic illustration of the mechanical relaxation machine. In that figure, the fabric 20, i.e., the needled fabric of the present invention, is passed between the nip formed by two counter rotating rolls, large roll 21 and smaller roll 22. Larger roll 21 carries on its periphery a plurality of relatively stiff pins or pointed wires such as a card wire 23 having upstanding wires 24. These upstanding wires are mounted in a flexible base, and the wires preferably having a kink or bend therein which positions the outer portion or tip of the wires in a direction opposite to the direction of rotation of the roll. Small roll 22 has a friction surface 25, which may have stiff upstanding wires or a non-slip rubber coating or more preferably a rubber coating with an abrasive or grit therein to provide a friction surface. The revolutions per minute of rolls 21 and 22 are so adjusted that there is a difference in the linear speed of the rolls on the periphery thereof. In other words, the peripheral surface speed of roll 22 will be different from the peripheral surface speed of roll 21. This difference in peripheral surface speeds of the two rolls may be accomplished in any way desired, such as gear and chain assemblies driven from a common motor or other power source, or independent adjustable speed motor drives.

In operation, the fabric to be mechanically relaxed is passed between the nip of the roll carrying the wire on its periphery and the roll having the friction surface. Since the peripheral surface speeds of roll 21 and roll 22 are different, counter forces are applied to the fabric in the direction of the movement of the fabric, i.e., by the wire tips and the friction surface. This force mechanically works fibers of the fabric, relative to one another, and moves the fibers in the direction of the movement of the fabric through the nip of rolls 21 and 22, which movement correspondingly reduces the relative distance between fibers. FIG. 12 is a highly idealized illustration of the foregoing. In FIG. 12, a fabric 30 having a plane of fibers 31 is moved between the nip of rolls 21 and 22 and opposing forces illustrated by arrows 32 and 33 are applied to the fabric by wire points and/or friction surface as it passes through the nip. These forces work and push the fibers in the direction of movement of the fabric and reduce the distance between fibers. Thus, the distance A between fiber planes before the fabric is passed through the nip of rolls 21 and 22 is reduced to distance B after passing through the nip. The overall effect on the fabric is that of decreasing the length of the fabric as it passes through the nip between the rolls. By applying force at discrete points, the fibers in the structure have the possibility of movement over one another so as to bring about relaxation and an overall change in the dimensions of the structure.

As can be appreciated from FIG. 1, needled fabric is pulled through a number of different operations during the processing thereof. This machine direction pull of the fabric inherently builds into the fabric stresses between the fibers and in the overall fabric in the machine direction, and causes some fibers to be oriented in the machine direction. This machine direction stress is considerably greater than the transverse direction stress, and the resulting modulus in the machine direction is much greater than the modulus in the transverse direction. If no relaxation of the structure were to take place, then the modulus diagram, in the nature of those illustrated in FIGS. 7 through 10, might well appear in the general configuration as that shown in FIG. 13. This, of course, is considerably different from the modulus diagram of leather and would suffer from the disadvantages which have been noted above in connection with conventional artificial leather.

By adjusting the difference in peripheral surface speed between rolls 21 and 22, and the pressure therebetween, the amount of working and movement of fibers, during one pass between rolls 21 and 22, can likewise be adjusted. This adjustment of the rolls, essentially correspondingly adjusts the forces 32 and 33 exerted on the fibers passing between the nip of rolls 21 and 22. By then utilizing multiple passes through the nip of rolls 21 and 22, the modulus diagram can be changed during these plurality of passes from that illustrated in FIG. 13 to one similar to that illustrated in FIG. 7, or a desired modulus diagram. It is important to note that the modulus diagram could be adjusted so that the fabric is completely isotropic in modulus characteristics, i.e., the modulus of the fabric is the same in every direction, as illustrated in FIG. 14. This is a unique textile fabric with obvious advantages. However, for the purposes of the present artificial leather, it is preferred that the modulus diagram be similar to that of leather, and, for this reason, the fabric is mechanically relaxed by passing through the nip of rolls 21 and 22 a sufficient number of times to produce a modulus diagram essentially the same as that of leather. With such modulus characteristics, the resulting artificial leather can be formed on a last by the identical methods used for forming leather uppers on a last. No additional steps or special considerations are therefore required in processing the present artificial leather into shoes.

While, for the present purposes of artificial leather, it is only necessary to adjust modulus in the machine direction, for the reasons noted above, if desired for other purposes or to build special modulus diagrams for the fabric, the fabric may additionally be run through the nip of rolls 21 and 22 in both the machine direction and the transverse direction, as well as at angles therebetween. This will allow the building of a modulus diagram as desired.

While the difference in peripheral surface speeds of rolls 21 and 22 may vary from as little as 1% to as great as 100%, it is preferred that this difference in peripheral surface speeds be between approximately 10% and 45%, especially between 20% and 35%. Also, while not required it is preferred that roll 22 be the roll of greater peripheral surface speed. The normal pressure exerted on the fabric passing through the nip of rolls 21 and 22 can be adjusted simply by changing the distance between roll 21 and roll 22. This distance adjustment may be carried out by any expedient mechanical means, but simply adjusting pillow blocks holding the axles of the rolls is suitable. Alternately, this may be done with worm screw adjustments, hydraulic cylinders, movable bearings and the like.

The wire used on roll 21 is suitably a conventional carding wire, but any wire may be used so long as the wire has sufficient stiffness to apply force on the fabric at discrete points and thereby move individual fibers relative to one another, as discussed above. Some flexibility is desired and results from the character of the fabric base in which the wire points are mounted as well as from the length and diameter of the pointed wire. Of course, different sizes and modulus of wire can be used depending upon the number of upstanding wires per square inch on the card wire surface. Thus, wires of smaller diameter and hence lower modulus may be used if greater numbers of the wires per square inch are present on the surface of roll 21. Conversely, small numbers of wires per square inch may be used when the wires are thicker and of greater modulus. Irrespective of the foregoing, it is necessary that the wires present a total surface on roll 21 which is sufficient to apply substantial forces to the individual fibers of the fabric and move those individual fibers relative to one another, as discussed in connection with FIG. 12. This can be determined by simple experiment with any specific fabric and any degree of relaxation desired.

It is preferred that the wires used on roll 21 have a curvature or bend therein (the latter embodiment being shown in FIG. 11). The bent configuration of the wires assist in applying nonslip force to the fabric and makes it easier to withdraw the wire points without disrupting or otherwise displacing fibers in a non-desired manner.

A suitable wire is shown in FIG. 15. The dimensions A and B may be approximately equal, while C is about ⅔ of A or B. The angle theta is about 20° to 45°, more preferably about 30°. The wire is preferably pointed as shown at F. As a specific embodiment, A and B are about 3/16 inch, theta is about 30° and the diameter of the wire D is approximately 10 to 20 mils.

It should be appreciated from the above, however, that the direction of bend in the wire will be in a generally opposite direction to the movement of the fabric. Thus, as illustrated in FIG. 11, the bend in the wire, as viewed in the nip between the rolls, is in a direction generally opposite to the direction of the movement of the fabric. It should also be noted that while FIG. 11 shows roll 21 to be of greater diameter than roll 22, this arrangement is simply for convenience and the rolls may be of the same diameters, or any combination of diameters, as long as the peripheral surface speeds of the rolls are different, as described above.

The needled fabric may be composed of any desired fibers or combination of fibers, but the combination of fibers must have the capacity to shring if the heat-shrinking step is practiced. Preferably, the fibers or combination of fibers, taken as a unit, should be capable of shrinking at least 5% and up to 40%, although shrinkages between about 10 and 20% are preferred. Also, as can be easily appreciated mixtures of various fibers having various degress of shrinkability may be used so long as the total combination, as a unit, has shrinkage capabilities within the above-defined ranges. Alternately, the shrinkable or more shrinkable fibers may be placed predominantly near the face surface, for example, by using those fibers, mainly, in the outermost layer or layers in the first carding operation and/or in the second carding of the fine fibers.

It is also desired that the fibers be crimped since the crimping allows a more random orientation of individual shafts of fibers and also facilitates entanglement during the needling operations. Natural fibers, such as wool, have a natural crimp therein, but synthetic fibers, such as polyesters, do not have a natural crimp, and it is, therefore, preferred that crimped synthetic fibers be used. The degree of crimping can vary considerably, but it is preferred that the crimped length be from ⅞ to ¼ the uncrimped length of the fiber, preferably between ½ and ¾ of the uncrimped length. Generally, the number of crimps per inch of fiber will be between 3 and 20, but preferably between 6 and 20.

As noted above, the particular composition of the fiber is not critical to the invention, and various combinations of fibers may be used. These combinations may include natural fibers of plant or animal origin such as cotton, collagen and wool, and synthetic fibers such as nylon, acrylics, olefins, e.g. polyethylene, polypropylene, polyvinyl chloride, polyvinyl acetate/polyvinyl alcohol, polyvinyl chloride/polyvinyl vinylidene and polyester. The preferred fibers, however, are commercial nylon and/or polyester fibers, since these fibers provide excellent workability in the process and have inherent chemical properties which resist degradation due to perspiration and the like.

It should be appreciated from the above that the basic structure of the invention is the needled fabric and that the fabric is such a coherent, entangled and dense material that the fabric alone closely resembles leather. With this basic fabric, any desired finish and technique for placing the finish on the fabric may be used as is practiced with conventional leather finishes. These finishes may be applied with conventional leather filler, base and top coats, the polymers of which may be, among others, acrylics, polyurethane, nitrocellulose and the like, all of which are well known in the art. However, it is usually desirable that the finish or finishes be applied in such a manner and in such quantities that the fabric of the invention does not carry an impervious coating thereof. In other words, the quantity of base coat and finish applied to the present fabric should be in the range applied to leather. On the other hand, while not preferred, the finish may be impervious in the manner of some artificial leather, e.g., impervious or substantially impervious coatings of polyvinyl chloride or polyurethane. Also, it will be appreciated that leather is finished with conventional base coats and top coats only with sufficient quantity to provide color, luster and smoothness to the surface of the leather and not, usually, to the extent to prevent the transmission of water vapor. This required quantity of coating and/or finishing can be conveniently applied by way of a flexible doctor blade. By doctoring the coating and/or finish with a flexible doctor blade, the irregularities and depressions on the face surface of the present fabric can be effectively coated by action of small flexures of the flexible doctor blade. Hard rubber, thin flexible steel and the like can be used for the doctor blade.

Alternately, the coats and finish may be sprayed or otherwise applied to the fabric, but preferably the coats, finish and technique of application thereof should result in products being resistant to transmission of liquid water but not impervious to the transmission of water vapor. Thus, preferably the coats and finishes will be disposed on the face surface of the fabric as a discontinuous and pervious film.

While any conventional leather finish and technique for application thereof may be used with the present needled fabric, as discussed above, it has been found that a novel surface treatment technique prior to conventional finishing procedures produces an exceptionally snag resistance artificial leather. Additionally, this surface treatment allows the development of aesthetically pleasing surfaces with the finishing materials and enables applications of finishes which have greater permeability to water vapor. According to this aspect, the face surface has a plurality of short upstanding fibers projecting therefrom. After the sanding, a polymer is applied to the surface in a manner to coat the upstanding fibers but not to allow penetration into the textile fabric. Thus, a solution, suspension or melt of a polymer may be used so long as the foregoing function is obtained. Any excess polymer is removed, e.g., by scraping with a doctor blade or the like, and the polymer is allowed to gel. In this regard, gelation can take place by solvent evaporation, precipitation and cooling, respectively, from a solution, suspension or melt. Alternately, the monomers of the polymer, along with a suitable catalyst and initiator if required, may be disposed on the surface and polymerization thereof may take place. Irrespective of the mode of depositing the polymer on the surface, after scraping, the surface is subjected to heat and pressure which causes the fibers to be pressed in directions parallel to the surface of the fabric and bonded in that plane. Accordingly, a surface matrix consisting primarily of fibers randomly arranged in directions parallel to the surface of the fabric is obtained. One end of the fibers in that surface matrix is rooted in the structure of the fabric and the surface matrix is smooth but porous and has a high snag resistance. The so-obtained surface is most suitable for application of finishing coats. It should also be noted that during the heating and pressing step, the pressure need not be entirely perpendicular to the surface and may have a component of movement parallel to the surface. Thus, an ironing in a random or oriented direction may take place on the surface. Of course, in any regard, the fabric must be cooled after the surface matrix has been formed and before release of the pressure.

As can be appreciated from the foregoing, the dense fibrous nature of the fabric surface allows the use of conventional leather finishes and techniques and thus the finished product is porous in nature, similar to leather, and has a multitude of interlocking fibers at the surface thereof, again in the nature of leather. With these properties, any scuff or abrasion of the face surface of the material can easily be repaired by polishing in the same way that similar damage is repaired with leather shoes. Since there is no thick polymeric film coating which can peel or crack, the difficulties of conventional artificial leather, in this regard, are obviated.

The present artificial leather also has a unique advantage in that while a grain may be embossed therein, as described above, a grain can be imposed on the material simply by bending or flexing the material, in the same manner that leather may be so grained (the use of conventional boarding machines). Commercial artificial leathers with relatively thick surface films do not have this property.

Additionally, it should be noted that, if desired, a polymeric film coating can be applied to the face surface of the present fabric in the same manner as applied to conventional artificial leathers and sometimes to leather, i.e., a "patent" finish. Thus, for a very glossy finish, a relatively thin polymeric film coating of a conventional polymer, such as polyurethane or polyvinyl chloride may be applied. The coating may or may not be microporous or macroporous to allow liquid or vaporous water transmission therethrough. However, with the present artificial leather, the polymeric coating can be considerably thinner than those required by conventional artificial leathers, and this substantially mitigates the problems associated with the coating of conventional artificial leathers. Generally speaking, coatings, such as polyurethane coatings, of only 3 to 20 mils thick may be used, and more preferably, coatings between 4 and 12 mils may be used. Coating techniques and compositions useful with the present invention are described in detail in U.S. Pats. 3,000,757; 3,067,482; 3,100,721; 3,190,766; 3,208,875; 3,284,274 and 3,483,015, the entire disclosures of which are incorporated herein by reference.

While a polymeric coating may be applied in the manner of conventional artificial leathers, i.e., in the manner well known for the production of Corfam, as illustrated by the above referenced U.S. patents, it is preferred that the film of polyurethane be prepared by heating and pressing open celled foamed polyurethane until the foamed polyurethane produces a microporous to macroporous film. This film can then be simply laminated to the present artificial leather by use of an adhesive coat. The films produced by heating and pressing foamed polyurethane are well known in the art, for example, the films of U.S. Pat. 3,325,338, the entire disclosure of which is incorporated herein by reference.

Because relatively thin films can be applied to the present fabric, the memory inherent with polymeric films is insufficient to prevent the fibers of the textile fabric from retaining a permanent set as shoes made from the material are worn. In other words, the thin films which can be used with the present artificial leather do not significantly deteriorate the otherwise desirable properties of the present material to take the set in the nature of leather. Likewise, the films do not significantly deteriorate the desirable properties of the present materials to form over conventional shoe lasts without special processing steps or machinery. The essential modulus diagrams, discussed above, are retained even when the present thin films of polyurethane are laminated thereto.

Figure 19:
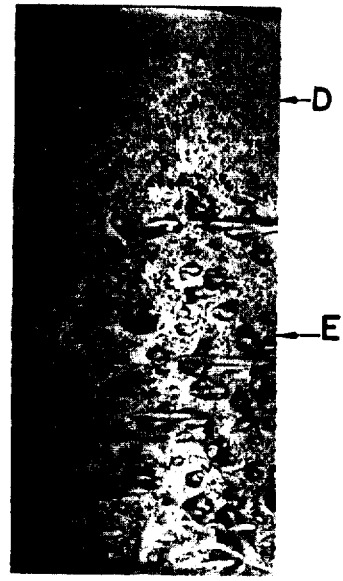
FIG. 19 is a microphotograph of a cross section of a second commercial artificial leather.

Some of the unique aspects of the present invention can be understood from FIGS. 16 through 19. These Figures are photomicrographs, of approximately 60× to 80× enlargement, of leather, the present material, a first commercial artificial leather and a second commercial artificial leather, respectively. From FIG. 16, it can be seen that leather is very fibrous in nature and has bundles of fibers intimately entangled in all directions. It can also be noted that leather has a density gradient from the back surface, the lowermost part of the photograph, to the face surface. Comparing FIGS. 16 and 17, it can be seen that the present material, similar to leather, is made of bundles of fibers disposed in directions similar to leather and having a density gradient quite like leather. In contrast to both leather and the present material, the first commercial artificial leather is clearly a laminate with a polymeric film A, a woven intermediate portion B, and a textile substrate C. The polymeric coating, while porous, is relatively thick and the textile substrate bears little relationship to the disposition of fibers of leather, or for that matter of the present material. No density gradient similar to leather or the present material is detectable from FIG. 18. Likewise, FIG. 19, showing a second commercial artificial leather is even more different from leather than the first commercial artificial leather. That second commercial artificial leather has a relatively thick polymer surface film D which extends into and around fibrous substrate E. Again, the substrate has fibers disposed in directions most dissimilar to leather and to the present invention.

From viewing FIGS. 16 through 19, the unique properties of the present invention, as compared with commercial artificial leathers, and the properties of the present invention which are most similar to leather, can be understood. The present structure could be characterized as a man-made textile equivalent to leather in many respects. Thus, the present material does not suffer from the disadvantages of commercial artificial leathers, noted hereinbefore, but yet, at the same time, provides most of the desirable properties of leather and eliminates some of the undesirable properties of leather.

In one aspect, the present desirable properties are obtained in connection with the present depth and number of needle penetrations which produces a fabric which is unique in regard to the character of the fiber entanglement. Generally speaking, conventional needled fabrics are produced by needling a batt with depth of needle penetration such that the foremost barb of the needles passes about ⅜ of an inch beyond the opposite face of the batt, i.e., the face opposite the face from which needle penetration commences. The foremost barb, as well as other barbs on the shank of the needle, carries into and through the batt bundles of fibers in a looped configuration and the curved end of the loop of fibers passes through the batt entirely when the barbs of the needles penetrate through the batt to the foregoing extent. Also, in a fairly large percent of the needle penetrations, the fibers of the loops are so pulled through the batt that the loop configuration is destroyed and the needling produces only shanks of fibers extending beyond the face of the batt. Further, when the so-needled structure is then similarly needled from the opposite side, the needles pick up the protruding loops and shanks of fibers and again force these, at least in part, entirely through the batt and lodges them beyond the opposite face. Thus, the net result of this type of needling operation is to produce a structure wherein the majority of fibers are bound and/or held together as though the batt was a sewed structure and this structure has been referred to in the art as a ligated structure.

In contrast thereto, with the present invention the foremost barbs of the needles do not penetrate the opposite face of the composite to any substantial extent, and, therefore, the end of the loop of fibers carried by that foremost and other barbs, if any, do not protrude through the opposite face of the composite and a series of potential interlooping and interlocking of loop centers are produced. When the composite is then needled from the opposite face with similar low penetrations, the ends of the loops formed from one face and then from the opposite face can interloop and interlock.

With the very large number of needle penetrations, e.g., 12-25,000 per square inch, used in the present invention and with the looping procedure as discussed above, an entanglement network of interloopings and interlockings of the loops is accomplished in the present fabric by the needling operations even though the needles penetrate the composite in a random manner in comparison with the more systematic Fiberwoven process which uses precise positioning and angles of the needles, as well as a precise advance of the batt through the Fiberwoven loom. These interloopings and interlockings of loops provide a system of random fiber entanglement which, thusly, provides a structure or network which has the mechanical properties in the nature of leather.

Thus, for purposes of the present invention, the terms "random fiber entanglement" refer to random interlooping and interlocking of loops of fibers which is produced by needling a composite of staple fibers wherein the foremost barb of at least 75% of the needles does not penetrate, substantially or only slightly, through the opposite face of the composite being needled, and wherein the number of needle penetrations per square inch is sufficient that the final density of the fully needled fabric is at least 12 pounds per cubic foot. In this regard, the terms "substantially" or "slight," in connection with the needle penetrations is defined to mean not more than 1/16 inch beyond the opposite face. This amount of penetration beyond the opposite face is acceptable and in keeping with the foregoing disclosure, since depending on the characteristics of a given fiber, some retraction of the loops may take place when the needles are withdrawn. The density consideration is directly related to the extent of needling, since a normal number of needle punches at low depth of penetration will produce densities far less than the 12 pounds per cubic foot. The density referenced is the density accomplished by needling only and not by any other means, such as fillers, heat, pressure and the like, for increasing the overall bulk density of the fabric.

Thus, it is a feature of the invention to provide a fabric comprising needled staple fibers having random fiber entanglement and the fabric having an overall bulk density of at least 12 pounds per cubic foot. It is another feature of the invention to provide a process for producing such fabric wherein a composite of staple fibers is needled with a plurality of needles and wherein the foremost barbs of at least 75% of all the needles do not substantially penetrate the opposite face of the composite and wherein the needling is continued to produce random fiber entanglement and an overall bulk density of the fabric of at least 12 pounds per cubic foot.

The invention will be illustrated by the following specific examples, but the invention is not limited thereto and is fully applicable to the foregoing disclosure.

EXAMPLE 1

The procedure and apparatus of this example is, substantially, in accordance with that illustrated in FIG. 1. Onto a conveyor was carded a first layer of polyester staple fibers, Type HT, High-crimp, 1½ denier and 1½ inch length, produced by the American Enka Corporation. Sufficient fibers were deposited and cross-layed on the conveyor to provide 2 ounces of fibers per square yard.

A second layer of staple waste polyester fibers was carded on the first layer. This layer was a blend of fibers having deniers between 2 and 5 and lengths between 1½ and 3 inches, with an average denier of 3 and an average length of 2½ inches. The fibers were crosslayed on the first layer of fibers until 6 ounces per square yard of fibers were carded. This second layer of fibers is a combination of the two inner layers of FIG. 1, thus illustrating that there is latitude for convenience and economy in practicing the present invention.

A lightly bonded nonwoven light-weight polyester web was placed on top of the second layer of fibers and an identical additional web was placed on top of the first web. These nonwoven webs are used only to improve handling and subsequent separation of the composites of layers and do not remain in the structure as a separate entity but during the needling operations are completely disintegrated and the fibers thereof function in the same manner as the carded fibers of the layers.

On top of the webs was carded a third layer of fibers which was identical to the second layer of fibers and on top of the third layer of fibers was carded a fourth layer of fibers which was identical to the first layer of fibers. Thus, the carding steps produced two composites of loosely matted fibers which composites are mirror images of each other and separated by the lightly bonded nonwoven light-weight polyester webs.

The two composites were passed by way of a conveyor and under a compacting roll to a first needling station. The first needling station consisted of a Fiberwoven loom with the standard four needling positions, each position having two needle boards, and each needle board having 32 needles per widthwise inch of the fabric passing through the loom. The needles were Foster 1-16-4C (1 barb-16 mil triangular blade-4 mil barb depth). The plate opening in position 1 was ¾ inch and the remaining plate openings were ⅜ inch. In positions 1 and 2 of this first needling operation, the barb of the needles of each needle board penetrated through the mirror image composites, but in positions 3 and 4, the needles of each needle board penetrated only slightly through each respective mirror image. The so-needled fabric was then run through a second Fiberwoven loom where all of the positions were arranged in the same manner as positions 3 and 4 of the first loom. In this first needling operation each needle penetrates each mirror image composite 8 times per linear inch and each composite has, therefore, 1330 needle penetrations per square inch.

After the first needling operation, the two needled mirror image composites were mechanically separated by pulling apart at the nonwoven webs, and after reversing the bottom composite, it proceeded through the process in the same manner as the top composite.

The composite was passed through a Fiberwoven loom having Foster 1-16-3C needles and plate openings in all positions of 5/16 inch. The barbs of the needles of the top needle board penetrated slightly through the back surface of the composite, while the barbs of the needles of the bottom needle board penetrated just to the face surface of the composite. Each needle penetrated each side of the composite 12 times per linear inch which corresponds to 1540 needle penetrations per square inch for each side of the composite. As will be appreciated, this is an additional needling operation performed between the first needling and second needling operations as shown in FIG. 1. This further needling operation illustrates that various combinations of needling may be used in carrying out the present invention, consistent with the function of the needling as disclosed hereinbefore.

Onto the surface of the so-needled composite was carded a first layer of relatively short fibers in an amount of 3 ounces per square yard. The denier of the fibers was 1½ and the length was 1½ inches. The fibers were polyester staple fibers, Type HT, High-crimp, manufactured by the American Enka Corporation. Thereafter, a second layer of fibers was carded on the first layer of carded fibers. The second layer was identical to the first layer except that the length of the fibers was ⅝ inch.

The composite with the carded fibers thereon was then needled in a Fiberwoven loom with a plate opening of ¾ inch in position 1 and ⅜ inch in positions 2 through 4. The needles, the barb penetrations, the needle punches per inch per needle and the total needle penetrations per square inch were the same as in the previous needling step. Thus, there were 1540 needle penetrations for each side of the composite.

The so-needled composite was immersed in a bath of needling fluid (amine salt of coconut fatty acids, Penetrant, GWX, Woonsocket Color and Chemical Co., diluted to 6% solids with water). The composite had add-ons of the needling fluid between 150% and 200%. The composite with the needling fluid was passed to a Fiberwoven loom where the plate opening in all positions was 5/16 inch; thereafter the composite was passed to a second Fiberwoven loom with the same plate openings; and thereafter the composite was passed to yet a third Fiberwoven loom where the plate openings were 3/16 inch. The needles in each of these looms were the same as in the previous needling operation. In the first two looms, the barb penetrations were the same as the previous needling operation, but in the third loom, the barbs of the top needle boards penetrated through the composite by 1/8 inch. Each needle penetrated 12 times per linear inch in the first loom and 20 times per linear inch in the second and third looms; thus, there were 6658 needle punches per square inch on each side of the composite.

The needled fabric was washed in clean water to remove the needling fluid and squeezed to remove the wash water therefrom. The fabric was heated with an open flame and dried at temperatures less than 250° F.

During the needling operations described above, the composite was fed into the looms in a manner to minimize machine direction tension on the composite. This minimum tension also allowed the composite to wander or wobble slightly in the transverse direction while passing through the looms. However, even with this minimum machine direction tension, the length of the resulting needled fabric was increased over the length of the original composite by about 40%, i.e., the length of the fully needled fabric was 40% greater than the length of the composite of layers of fibers immediately after carding.

In order to correct the out-of-balance modulus produced by this elongation of the composite and to relax the fiber structure of the resulting needled fabric, the fabric was passed through the apparatus of FIG. 11. Roll 22 carrying a grit impregnated rubber surface operated at a peripheral surface speed 35% greater than roll 21 carrying a wool card wire surface. i.e., a 35% overfeed. The fabric was passed in the machine direction through the nip between rolls 21 and 22, six times which resulted in a decrease of 15% in the length (machine direction) of the fabric. The rolls of the machine were adjusted so that the outermost portion of the wires of roll 21 lightly touched the surface of roll 22. It is optimal that the fabric may be heated while in the machine of FIG. 11 by contacting a heated shoe (e.g., heated to 250° F.) after passing through the nip of rolls 21 and 22 but before release from roll 21.

The material was heated from the face surface by a blast of air at 500° F. for approximately 4 to 5 seconds, with subsequent light standing of the back face to even the thickness of the fabric, and immediately passed to a travelling belt press. A portion of the top belt was heated to 460° F. so that the fabric passing between the top and bottom belts was in contact with the 460° F. heated portion of the belt for only about 6 seconds. The face surface of the fabric contacted the top heated belt. Latter portions of both the top and bottom belts were cooled by circulating cooling water through a flat heat exchanger over which the belts passed and these latter portions of the belt were maintained at temperatures below about 200° F. Before releasing the pressure on the fabric exerted by the belts, the fabric was cooled to below 200° F. The pressure on the belts contacting the fabric was 60 p.s.i.

The fabric, after passing through the belt press, had a thickness of about 66 mils and a weight of about 14 ounces per square yard, i.e., a density of about 17 pounds per cubic foot.

The fabric was impregnated with a natural rubber latex having the following compositions:

| | Parts by weight |
|---|---|
| A-component at 50% solids: | |
| Natural rubber latex (Lotol GX–3289 Uniroyal Chemical) | 100 |
| Water | 34 |
| Sodium polyacrylate water soluble latex thickener (Acrysol ASE 60, Rohm & Haas) | 0.34 |
| Ammonium hydroxide, to adjust pH to 8.0. | |
| B-component: | |
| Water | 4.91 |
| Potassium oleate | 2.77 |
| Ammonium chloride (20% with ammonia added to pH 10) | 0.96 |
| Zinc mercaptobenzothiazide (Uniroyal NX–503–C, OXAF) | 1.09 |
| Sulfur (in dispersion form—Uniroyal NX–762–B) | 1.09 |
| Zinc oxide (in dispersion form—Uniroyal NX–935) | 1.04 |
| Zinc dibutyldithiocarbamate (Uniroyal Butazate-50–D) | 0.58 |
| Aqueous carbon black pigment dispersion at 30% solids | 2.84 |

Components A and B are mixed at 3 parts A to 1 part B.

The fabric was immersed in the impregnant compositions, and then squeezed lightly to produce a weight add-on of approximately 200%.

The impregnated fabric was passed immediately into a steam chamber maintained at atmospheric pressure and containing steam superheated to about 218° F. The fabric remained in the chamber for about 10 minutes with minimum contact of the fabric with the surfaces of the chamber. The solids of the impregnant composition were coagulated and cured during this steam treatment.

The fabric is then passed out of the steam chamber and dried at temperatures less than 250° F.

The back surface of the fabric was lightly buffed with 180-grit abrasive paper to remove about 2 mils of material from the back surface. The face surface was buffed with the same paper to remove up to about 5 mils from the face surface. The face surface was polished by further sanding with 400-grit abrasive paper.

A urethane tie coat was applied to the face surface of the fabric with a thin flexible steel doctor blade having a generally rounded tip and inclined at 80° from the horizontal in the direction opposite to the movement of the fabric. The doctor blade had a pressure of 2½ pounds per linear inch. The urethane tie coat had the following formula:

| | Parts by weight |
|---|---|
| Prepolymer of polytetramethyleneether glycol (MW 1000) and tolylene-2,4-diisocyanate [1] | 100 |
| Phenyl diisocyanate | 22 |
| Trichloroethylene | 30 |

[1] The Adiprene L series produced by E. I. du Pont and the Daltoflex A–40 series produced by ICI America are urethane rubber prepolymers and are equivalents for the present purposes.

The fabric with the tie coating thereon was dried under infrared lamps. The amount of dried tie coat on the fabric was about 1.3 grams of tie coat per square foot.

The fabric was then allowed to lag at room temperature for about three hours until the urethane tie coat cured to approximately 30% of the maximum potential cure (cross-linking). This partial curing of the urethane tie coat brings the resin on the surface fibers into such a condition that when normal mechanical pressure and heat is exerted thereon, the upstanding fibers at the surface are oriented in the plane of the fabric and join together in a fiber polymer surface matrix that is both porous and very highly scuff resistant.

The fabric with the tie coat thereon was then passed through a heated belt press to accomplish the perpendicular mechanical pressure noted above. The speed of the fabric was seven feet per minute. The forward portion of the top belt, next to the face surface of the fabric, was heated to 400° F. and the forward portion of the bottom belt, next to the back surface being cooled to less than 100° F. The latter portions of both the top and the bottom belts were cooled to about 75° F. The belt press exerted a pressure of approximately 20 pounds per square inch. The fabric going into the belt press had a thickness of about 75 mils, and the fabric exiting the belt press had a thickness of about 72 mils.

A base color coat was sprayed onto the pressed tie coat, using an atomizing nozzle with a pressure of 45 pounds per square inch. The base color coat had the following formula:

| | Parts by weight |
|---|---|
| Primal Ochre (pigment) | 15 |
| Primal White 264 (pigment) | 9 |
| Primal Red (pigment) | 1 |
| Water | 38.5 |
| Flexible unplasticized emulsion of 74/20/3/3 copolymer of ethyl acrylate, methyl acrylate, methylol acrylamide and methacrylic acid [1] | 36.5 |

[1] Primal 510, Rohm & Haas Co. is equivalent for purposes of the present invention.

The base color coat was then dried under infrared heaters (temperatures less than 200° F. on base coat) to provide a dried coating of about .8 gram per square inch. The spraying and drying of the base coat was repeated two additional times with each repeat providing an additional .8 gram per square foot of base color coat. In the last spraying of the base color coat, four parts of wax solution was added per 100 parts of base color coat in order to provide a mold release surface for the subsequent embossing step.

The fabric was then embossed at 345° F. for 15 seconds using a Sheridan Batch Press with a pressure of about 500 pounds per square inch. The embossing step reduced the thickness of the fabric about 10% and produced a leather grained surface texture.

A top finish coat was then sprayed on the fabric. The spraying was accomplished with an atomizing spray nozzle using 45 p.s.i. pressure. The spray was inclined at an angle to the fabric of about 30° in order to highlight the embossed surface texture. The top finish coat was dried under infrared heaters (temperatures of finish coat of less than 200° F.) to produce a dried coating of about .3 gram per square foot. The formula of the top finish coat was as follows:

| | Parts by weight |
|---|---|
| Nitrocellulose lacquer | 50.0 |
| Methyl ethyl ketone | 15.0 |
| Di-isobutyl ketone | 30.00 |
| Carbon black | 5 |

The fabric was then fully cured at 330° F. for 2 minutes in a tunnel drier.

The back surface of the fabric was sprayed with a solution of a leather softener of the following formula:

| | |
|---|---|
| Sulfonated animal and vegetable fat, 2½–5% SO₃ content | 12 |
| Water | 88 |

The leather softener was applied in an amount of about 3 grams per square foot. The leather softener improves the hand of the fabric, in terms of leather, and also provides a leather odor to the fabric.

The fabric was mechanically softened by boarding in a conventional leather boarding machine with the face surface contacting the rolls of the boarding machine.

The resulting product was supple, having the feel, grainy appearance, color and texture of leather. The density of the material was approximately 35 pounds per cubic foot. The bending break had 18 wrinkles per inch indicating the flex axis very near the face surface. The bulk density gradient from the back surface to the face surface was approximately 1:2.5. The material was fabricated into a number of pairs of shoes (shoe uppers), in the same manner as leather and wear tests showed that the material functioned at least equal to leather in shoe uppers.

EXAMPLE 2

The procedure of Example 1 was repeated except that the initial carding of fibers produced 2 composites of layers of fibers which composites had three different layers of fibers. The first layer had an average denier of 4 and an average length of 2¼. The second layer had an average fiber denier of about 3 and an average length of about 1½, the third layer had an average fiber denier of 1½ and an average fiber length of 1½. The product resulting from the process exhibited the similar properties as the product of Example 1, except that the density gradient was 1:3.

The terminology used in this specification is for the purpose of description and not limitation, the scope of the invention being defined in the claims.

What is claimed is:

1. A needled textile fabric characterized by high bulk density, entangled fibers, and a controlled axis of flexure, said fabric comprising textile fibers needled together into an integral structure with a face surface and back surface and having coherent fiber entanglement, said structure having an overall bulk density of at least 6 pounds per cubic foot and a bulk density gradient wherein the bulk density increases from the back surface to the face surface, said needled structure having an axis of flexure which lies within about .3 of the distance from the face surface to the back surface.

2. The fabric of claim 1 wherein the bulk density gradient is provided by a needle pick-up gradient which decreases from the back surface to the face surface.

3. The fabric of claim 1 wherein the bulk density gradient is provided by a needled plurality of layers of fibers and the average fiber denier of the layers decreases from the back surface to the face surface, the denier of the fibers being between ½ and 8.

4. The fabric of claim 3 wherein the said structure contains staple fibers having an unstressed length between about ¼ inch to 4 inches.

5. The fabric of claim 4 wherein the said structure before needling has a plurality of superimposed layers, each of said layers being of different fiber denier, and the average denier of the fibers in the layers decreases with adjacent layers from the back surface to the face surface, and after needling the distinct layers are not substantially preserved but the said decreasing fiber denier gradient of the structure is substantially preserved.

6. The fabric of claim 5 wherein a plurality of said needled layers have relatively long unstressed fiber lengths of at least ¾ inch and wherein at least one layer of fibers superimposed and needled on and into the face surface of said structure has relatively short unstressed fiber lengths of less than ¾ inch, whereby the bulk density at or near to the face surface of the structure is increased and defines a dense region of bulk density higher than the bulk density of the remaining portion of the structure.

7. The fabric of claim 6 wherein the axis of flexure lies at least close to the dense region.

8. The fabric of claim 7 wherein the axis of flexure lies in the dense region.

9. The fabric of claim 6 wherein the plurality of superimposed layers of different fiber denier of said structures have, prior to needling, a fiber length decreasing from the back surface to the face surface and define a decreasing fiber length gradient, and after needling, the decreasing fiber length gradient is substantially preserved in the structure.

10. The fabric of claim 1 wherein the coherent fiber entanglement of said structure includes some of the fibers being oriented into rows of fiber chain entanglement, the rows extending lengthwise of the structure.

11. The fabric of claim 1 wherein the overall bulk density of the structure is at least 8 pounds per cubic foot.

12. The fabric of claim 1 wherein the overall bulk density of the structure is at least 12 pounds per cubic foot.

13. The fabric of claim 1 wherein fibers of the structure at and adjacent to the face surface have been shrunk and define a compacted region after shrinkage which extends into the structure a distance less than the thickness of the structure and wherein no substantial reduction in planar area of the structure has taken place.

14. The fabric of claim 13 in which at least part of the fibers at and adjacent to the face surface are heat shrinkable.

15. The fabric of claim 1 wherein the structure has open interstices between the fibers and the interstices have a filler impregnated therein.

16. The fabric of claim 15 wherein the filler is an elastomer in the form of solid particles.

17. The fabric of claim 16 wherein the elastomer particles are in clusters of particles.

18. The fabric of claim 17 wherein the clusters of particles are predominantly loosely bonded to the fibers of the structure.

19. The fabric of claim 16 wherein the impregnated elastomer is in an amount insufficient to fill all of the interstices between the fibers of the structure.

20. The fabric of claim 19 wherein the elastomer impregnated in the structure has a weight between 10% and 200% of the weight of the fibers in the structure.

21. The fabric of claim 20 wherein the bulk density of said structure is between 20 and 45 pounds per cubic foot.

22. The fabric of claim 15 having a buffed or sanded face surface whereby the face surface is cleaned, smoothed and rendered suitable for receiving a finish.

23. The fabric of claim 22 having a finish on the face surface.

24. The fabric of claim 23 having a textile finish on the face surface.

25. The fabric of claim 24 wherein the textile finish is a softener.

26. The fabric of claim 22 having a leather finish on the face surface.

27. The fabric of claim 26 having a leather softener applied to the back surface of the structure.

28. The fabric of claim 1 wherein the overall bulk density of the structure is at least 13 pounds per cubic foot.

29. The fabric of claim 1 wherein the overall bulk density of the structure is at least 14 pounds per cubic foot.

30. The fabric of claim 1 having a face surface of upstanding fibers projecting therefrom, and having a polymer coating on the upstanding fibers and wherein the said coating does not substantially penetrate the fabric.

31. The fabric of claim 30 wherein a micro or macroporous foamed and pressed polyurethane film is disposed on the surface of the fabric.

32. The fabric of claim 1 wherein the fibers at the face surface of the fabric have polymer thereon and the fibers are bonded together to form a surface matrix consisting primarily of fibers randomly arranged in directions parallel to the surface of the fabric with an end of the fibers of the surface matrix rooted in the structure of the fabric.

33. The fabric of claim 32 having a finish thereon.

34. The fabric of claim 32 with an embossed surface.

35. The fabric of claim 32 with a polymeric film applied to the surface thereof.

36. The fabric of claim 1 having a modulus similar to leather.

37. The fabric of claim 1 having a constant area under stress.

38. The fabric of claim 1 having isotropic modulus characteristics.

39. The fabric of claim 1 having from 12,000 to 25,000 needle punches per square inch.

40. A needled textile fabric characterized by high bulk density, entangled fibers, and a controlled axis of flexure, said fabric comprising textile fibers needled together into an integral structure having an overall bulk density of at least 6 pounds per cubic foot, a face surface and a back surface and having coherent needled fiber entanglement throughout to provide a predetermined modulus, the fibers of the structure at and adjacent to the face surface being shrunk to tighten the needled entanglement of fibers and define a region adjacent to the face surface having a higher modulus than said predetermined modulus, whereby the axis of flexure of the needled structure is closer to the face surface than to the back surface.

41. The fabric of claim 40 wherein said shrunk fibers provide increased bulk density in said region and reduce said structure thickness with substantially no reduction in planar area.

42. The fabric of claim 41 in which at least part of the fibers at and adjacent to the face surface are heat shrinkable.

43. The fabric of claim 42 wherein the coherent fiber entanglement of said structure includes some of the fibers being oriented into rows of fiber chain entanglement, the rows extending lengthwise of the structure.

44. A highly needled textile fabric adapted for use as an artificial leather comprising textile fibers needled together into an integral structure having coherent fiber entanglement, an overall bulk density of at least 12 pounds per cubic foot, a relatively constant area under stress and capable of taking a permanent set.

45. The fabric of claim 44 wherein the fiber entanglement is fiber chain entanglement.

46. The fabric of claim 45 wherein the fabric has a filler disposed therein and has an overall bulk density of at least 13 pounds per cubic foot.

47. The fabric of claim 46 wherein the fabric is finished at least on its face surface thereof.

48. The fabric of claim 44 wherein the overall bulk density of the structure is at least 13 pounds per cubic foot and wherein the structure includes some of the fibers being oriented into rows of fiber chain entanglement.

49. The fabric of claim 48 wherein the overall bulk density of the structure is at least 14 pounds per cubic foot.

50. A textile fabric comprising needled staple fibers having random fiber entanglement and the fabric having an overall bulk density of at least 12 pounds per cubic foot.

51. A process for producing the fabric of claim 50 wherein a composite of staple fibers is needled with a plurality of needles and wherein the foremost barbs of at least 75% of the needles do not substantially penetrate the opposite face of the composite and wherein the needling is continued to produce random fiber entanglement and an overall bulk density of the fabric of at least 12 pounds per cubic foot.

52. The fabric of claim 50 wherein the overall bulk density of the fabric is at least 13 pounds per cubic foot.

53. The fabric of claim 50 wherein the overall bulk density is at least 14 pounds per cubic foot.

54. A needled textile fabric comprising textile fibers needled together into an integral structure having coherent fiber entanglement, said structure having an overall bulk density of at least 12 pounds per cubic foot and the axis of flexure of the needled structure lies within 0.3 of the distance from the face surface to the back surface.

55. The fabric of claim 54 wherein the fibers of the fabric exhibit a gradient of fiber characteristics.

56. The fabric of claim 55 wherein the fabric has a fiber denier gradient or a fiber length gradient from the back surface to the face surface.

57. The fabric of claim 54 wherein there is a region of increased bulk density at or near the face surface.

58. The fabric of claim 54 wherein the fabric has a bulk density gradient wherein the bulk density increases from the back surface to the face surface.

59. The fabric of claim 54 wherein the ratio of perpendicular moduli of the fabric is no greater than 1:2.

60. The fabric of claim 59 wherein the ratio of perpendicular moduli is no greater than 1:1.5.

61. The fabric of claim 54 wherein the fabric has isotropic modulus characteristics.

62. The fabric of claim 54 wherein the fabric has a constant area under stress.

63. The fabric of claim 54 wherein the fabric has random fiber entanglement and an overall bulk density of at least 13 pounds per cubic foot.

64. The fabric of claim 54 wherein fibers of the structure at and adjacent to the face surface have been shrunk and define a compacted region after shrinkage which extends into the structure a distance less than the thickness of the structure.

65. The fabric of claim 54 wherein the coherent fiber entanglement of said structure includes some of the fibers being oriented into rows of fiber chain entanglement, the rows extending lengthwise of the structure.

66. A needled textile fabric comprising textile fibers needled together into an integral structure having coherent fiber entanglement, said structure having an overall bulk density of at least 8 pounds per cubic foot, a ratio of bulk density at or near the back surface of the structure to the bulk density at or near the face surface of the structure of at least 1:2 and the axis of flexure of the needled structure lies within 0.3 of the distance from the face surface to the back surface.

67. The fabric of claim 66 wherein the bulk density ratio is at least 1:3.

68. The fabric of claim 67 wherein the bulk density ratio is between 1:3 and 1:8.

69. The fabric of claim 68 wherein the bulk density ratio is between 1:3 and 1:5.

70. A process for making a needled textile fabric structure having a face surface and a back surface and having a controlled axis of flexure, said process comprising the steps of: forming a web of loosely matted fibers, said web having a needle pick-up gradient from the back surface to the face surface, needling the web sufficiently to produce an integral structure of cohering entangled fibers which has an overall bulk density of at least 6 pounds per cubic foot and the ratio of the bulk density at or near the back surface to the bulk density at or near the face surface being at least 1:2 and wherein axis of flexure of the needled structure lies at least within 0.3 of the distance from the face surface to the back surface.

71. A process as claimed in claim 70 in which a bulk density gradient is provided by superimposing layers of fibers, at least some of which layers have different average fiber denier, so that the average fiber denier of the layers decreases from the back surface to the face surface and needling the superimposed layers of fibers.

72. A process as claimed in claim 70 in which a bulk density gradient is provided by superimposing layers of fibers, at least some of which layers have different average fiber length, so that the average fiber length of the layers decreases from the back surface to the face surface and needling the superimposed layers of fibers.

73. A process as claimed in claim 70 in which a bulk density gradient is provided by superimposing layers of fibers, at least some of which layers have different average fiber denier and different average fiber lengths, so that the average fiber denier and the average fiber length of the layers decrease from the back surface to the face surface and needling the superimposed layers of fibers.

74. A process as claimed in claim 70 in which needling is accomplished by needling a web of superimposed layers of fibers into a first needled structure with a bulk density of at least 6 pounds per cubic foot, laying on the face surface of the first needled structure a web of at least one layer of relatively short loosely matted fibers and then needling the web of relatively short fibers into the first needled structure to produce a second needled structure with a bulk density of at least 8 pounds per cubic foot.

75. A process as claimed in claim 74 wherein the second needled structure is further needled to produce a third needled structure having a density of at least 12 pounds per cubic foot.

76. A process as claimed in claim 75 wherein the fibers of the third needled structure are relaxed to adjust the moduli of the structure and then the structure is further densified by shrinking the fibers at and adjacent to the face surface.

77. A process as claimed in claim 76 wherein at least part of the fibers at and adjacent to the face surface of the structure are heat shrinkable and the further densification is accomplished by applying heat to the face surface while maintaining the back surface of the structure relatively cool.

78. A process as claimed in claim 77 wherein the further densified structure is impregnated with a filler in an amount of between 5% and 200% of the weight of the fibers in the structure to provide a bulk density of the structure of between 20 and 45 pounds per cubic foot.

79. A process as claimed in claim 78 wherein the filler is an elastomer.

80. A process as claimed in claim 78 including buffing or sanding the face surface and then applying a finish to the face surface.

81. A process as claimed in claim 80 wherein the fabric is buffed or sanded and the upstanding fibers from the body of the fabric are coated with a polymer in a manner to substantially prevent penetration of the polymer into the body of the fabric and excess polymer is removed by scraping the fabric with a doctor blade.

82. A process as claimed in claim 81 wherein the coated upstanding fibers are subjected to heat and pressure to cause the fibers to be pressed in directions parallel to the surface of the fabric and bonded in that plane.

83. A process as claimed in claim 82 wherein the fabric is embossed.

84. The process of claim 75 wherein the overall bulk density of the structure is at least 13 pounds per cubic foot.

85. The process of claim 75 wherein the overall bulk density of the structure is at least 14 pounds per cubic foot.

86. A process as claimed in claim 70 wherein a polymer film is applied to the face surface of the fabric.

87. A process as claimed in claim 86 wherein a micro to macroporous foamed and pressed polyurethane film is applied to the face surface of the fabric.

References Cited
UNITED STATES PATENTS

| | | | |
|---|---|---|---|
| 3,206,351 | 9/1965 | Smith | 161—154 |
| 2,994,617 | 8/1961 | Proctor | 161—Dig. 2 |
| 3,090,099 | 5/1963 | Smith | 28—72.2 R |
| 3,090,100 | 5/1963 | Smith | 28—72.2 R |
| 3,298,080 | 1/1967 | Smith | 28—72.2 R |
| 3,506,530 | 4/1970 | Crosby | 28—72.2 R |

MARION E. McCAMISH, Primary Examiner

U.S. Cl. X.R.

28—72.2 R; 161—155, 166, Digest 2